United States Patent
Rao

(10) Patent No.: US 8,830,123 B2
(45) Date of Patent: Sep. 9, 2014

(54) SATELLITE NAVIGATION SYSTEM FOR OPTIMAL TIME TO FIRST FIX USING CODE AND CARRIER DIVERSITY

(75) Inventor: Vyasaraj Guru Rao, Bangalore (IN)

(73) Assignee: Accord Software & Systems Pvt. Ltd., Bangalore, Karnataka (IN)

( * ) Notice: Subject to any disclaimer, the term of this patent is extended or adjusted under 35 U.S.C. 154(b) by 368 days.

(21) Appl. No.: 13/354,336

(22) Filed: Jan. 20, 2012

(65) Prior Publication Data

US 2013/0187809 A1 Jul. 25, 2013

(30) Foreign Application Priority Data

May 12, 2011 (IN) .......................... 4230/CHE/2011

(51) Int. Cl.
*G01S 19/24* (2010.01)
(52) U.S. Cl.
USPC .................................................. 342/357.63
(58) Field of Classification Search
USPC .................................................. 342/357.63
See application file for complete search history.

(56) References Cited

U.S. PATENT DOCUMENTS

| | | | |
|---|---|---|---|
| 5,402,347 A | 3/1995 | McBurney et al. | |
| 5,914,685 A | 6/1999 | Kozlov et al. | |
| 2005/0212698 A1 | 9/2005 | Barron et al. | |
| 2007/0001899 A1 | 1/2007 | Lawrence et al. | |
| 2011/0103432 A1 | 5/2011 | Tangudu et al. | |

OTHER PUBLICATIONS

Vyasaraj. G, G. Lachapelle and S. B. Vijaykumar (2011), "Analysis of IRNSS over Indian Subcontinent," in Proceedings of ITM11, The Institute of Navigation, San Diego, Jan. 24, Session E5, 13 pages.

Vyasaraj. G, Shashidharan Maa and G. Lachapelle (2011), "Proposed LOS Signal Design for IRNSS to Reduce TTFF in a Single Frequency Receiver", Proceedings of GNSS Signal 2011, Toulouse, Session 12 pages.

Lachapelle G. (2010) Advanced GNSS Theory and Applications, ENGO625 Course Notes Department of Geomatics Engineering, University of Calgary, Canada.

Kaplan, E D. and C.J Hegarty (2006), Understanding GPS: Principles and Applications, Second edition Artech House.

Triumph-VS, (2011), "GNSS Receiver", JAVAD GNSS Rev 2.7, Jul. 19, 2011.

Pany. T (2010), "Navigation Signal Processing for GNSS Software Receivers", Artech House 2010.

(Continued)

*Primary Examiner* — Harry Liu
(74) *Attorney, Agent, or Firm* — Ash Tankha; Lipton, Weinberger & Husick

(57) ABSTRACT

A satellite navigation receiver and method for enhancing time to first fix are provided. The receiver comprises a radio frequency (RF) translator, correlator blocks, and a navigation data processor. The RF translator conditions navigation signals over carrier frequencies. The correlator blocks comprise a predetermined number of correlator channels configured for the carrier frequencies. The predetermined number of correlator channels is divided for parallel collection of sub-frames of navigation data across one or more operation service codes. The sub-frames of navigation data are collected across one or more operation service codes and on one of the carrier frequencies. The sub-frames of navigation data are collected across the carrier frequencies and on one of the operation service codes. The sub-frames of navigation data are collected across the carrier frequencies and across the operation service codes. The navigation data processor processes the parallelly collected sub-frames to estimate position of the satellite navigation receiver.

11 Claims, 21 Drawing Sheets

(56) References Cited

OTHER PUBLICATIONS

Arinc, Navstar GPS Space Segment / Navigation User Interfaces Interface Control Document (ICD), Revision 200C, prepared and published for GPS JPO, revised Sep. 1997, ION, Salt Lake City, USA.

Mishra, P. and P. Enge (2006), Global Positioning System: Signals, Measurements, and Performance, Second Edition, Ganga—Jamuna Press.

Arinc "Navstar GPS Space Segment / User Segment L5 Interface Control Document", ICD-GPS-705, Revision Two Dec. 2, 2002.

Galileo (2008), "Galileo Open Service Signal in Space Interface Control Document, OS SIS ICD," Draft 1, Feb. 2008 European Space Agency / European GNSS Supervisory Authority http://www.gsa.europa.eu/go/galileo/os-sis-icd.

| SERVICE | L5-DATA AVAILABILITY | S1-DATA AVAILABILITY |
|---------|----------------------|----------------------|
| SPS | YES | YES |
| PS | YES | YES |

FIG. 2

| SERVICE | L5-DATA AVAILABILITY | S1-DATA AVAILABILITY |
|---------|----------------------|----------------------|
| SPS | YES | NO, PILOT |
| PS | YES | YES |

FIG. 3

| | | |
|---|---|---|
| NAVIGATION DATA SPECIFICATIONS | ENCODING SCHEME | CONVOLUTIONAL ENCODING SCHEME |
| | CODE RATE | ½ |
| | CONSTRAINT LENGTH | 7 |
| | GENERATOR POLYNOMIAL | G1 - 171O<br>G2 - 133O |
| | DATA RATE | 100 SPS |
| | NAV DATA | ACCORD_05 |
| SPREADING CODE SPECIFICATIONS | TYPE | GOLD CODE |
| | CHIPS | 1023 |
| | CHIPPING RATE | 1.023 MBPS |
| | CODE LENGTH | 1 ms |
| | PRN | SPS (I-PHASE) - 1 TO 7 OF GPS<br>PS (Q-PHASE) – 8 TO 14 OF GPS |
| CARRIER SPECIFICATIONS | CARRIER FREQUENCY | L5 - 1176.45 MHz<br>S1 – 2492.028 -MHz |
| | BANDWIDTH | 2 MHz |
| | MODULATION | BPSK |
| | POWER LEVEL | -157 dBW |

FIG. 14

SATELLITE NAVIGATION SYSTEM FOR OPTIMAL TIME TO FIRST FIX USING CODE AND CARRIER DIVERSITY

CROSS REFERENCE TO RELATED APPLICATIONS

This application claims the benefit of non-provisional patent application number 4230/CHE/2011 titled "Satellite Navigation System For Optimal Time To First Fix Using Code And Carrier Diversity", filed on Dec. 5, 2011 in the Indian Patent Office.

The specification of the above referenced patent application is incorporated herein by reference in its entirety.

BACKGROUND

India is planning to deploy an autonomous regional satellite navigation system to cover its territorial footprint and the footprint of its surrounding areas. The purpose of this navigation system is to cater to the needs of both specific users that require a precise service (PS) and also to the needs of civilian users that require a special positioning service (SPS). The overall constellation of the Indian regional navigational satellite system (IRNSS) will have seven satellites, three of which will be in geostationary orbits and four in geosynchronous orbits. The signals will be transmitted in two bands, namely, L5 band (1176.45 megahertz (MHz)) and S1 band (2492.08 MHz). The SPS signal will be modulated by a 1 MHz binary phase shift keying (BPSK) signal, whereas the PS signal will use a binary offset carrier, BOC (5, 2).

Time to first fix (TTFF) is an important parameter for most satellite navigation receivers, and refers to the time taken by a receiver to output a first position solution from power-on. The TTFF parameter has been examined at length and several approaches have been proposed to reduce this parameter. However, most of the approaches have concentrated on augmenting the receiver with data aid to the receiver.

With the drastic improvements in semiconductor technology, the number of physical channels within a receiver is no more a constraint. Several receiver manufacturers have developed receivers with an excess of 200 channels, which exist concurrently. In addition, the receivers support all in view global navigation satellite system (GNSS) satellite signal processing. The modernized signals of a global positioning system (GPS), namely, L2C and L5, and the proposed signals of Galileo and Compass navigation systems have a minimum of at least two frequencies that support civilian applications. In parallel, there exists dedicated access to their military applications. With an assumption of dual frequency, there is a need for reducing the TTFF for civilian applications, and more importantly, for the precision service (PS) users.

To process GNSS signal leading to the navigation solution, top level functionalities of the receiver can be grouped into the following major categories: code and carrier acquisition, signal tracking, data demodulation, measurement generation, and user solution computation. Till recently in GPS, the SPS code was available only on the L1 frequency, that is, at 1575.42 MHz. However, since inception, PS users had codes on both the frequencies. As a consequence of this, PS users had distinct advantages over SPS users. First, the measurements performed on both the frequencies enabled ionospheric delay estimation. Second, if jamming is present on one frequency, the PS users can coast seamlessly on the other frequency. With a growing demand from a civilian segment for code on the second frequency, GPS and emerging GNSS systems have civilian ranging code on dual frequencies by default or triple frequencies (L5-GPS) in certain cases. In addition, current receivers do not have a limitation on the number of channels and thus, dual frequency processing has become a defacto standard.

In a standard dual frequency SPS receiver, when a lock is established on one frequency, by collaborative tracking methods, a direct lock can be established on the second frequency. Following this, data bit synchronization and measurements can be generated on the second frequency. Assuming that the data is the same on both the frequencies, data extraction or processing is typically not performed on the second frequency. For PS receivers, typically lock is first established on SPS code. Subsequently, based on a signature pattern hand over word (HOW), synchronization of the long PS ranging code is achieved. Effectively for a PS user, there will be three channels processing signals from each satellite, namely, two channels for the dual frequency PS measurements and another channel for SPS to provide access to the HOW word. However, the data processing is typically restricted to a single channel.

Information on navigation (NAV) data of the PS service is sparsely available. However, referring to the data sheets of the PS receivers from various manufacturers, TTFF remains the same to that achieved by the SPS service. This implies that the navigation data remains the same for both the services. To date, not much work has been carried out to exploit the advantages of code and carrier diversity.

A study was carried out on a signaling scheme of operational navigation systems with respect to multiple frequencies of operation. Of all the parameters used to compute TTFF, collection time of ephemeris data ($T_{eph}$) is a major contributor as $T_{eph}$ completely depends on the navigation data structure of a particular constellation and does not depend on the receiver. In addition, TTFF varies based on the various receiver start modes. In general, the start modes can be classified into four categories, for example, cold start, warm start, hot start, and snap start. In cold start, the receiver is powered on without any prior information. This predominantly takes more time to compute the navigation solution as the receiver has to search the signals of all the satellites of a GNSS constellation to obtain a signal lock, demodulate the data bits, and collect the entire navigation data. In warm start, the receiver has access to almanac data, approximate user position and time, which provides an estimate of all the visible satellites. The receiver pre-positions only the visible satellites onto the available channels and attempts to acquire the signals. To this extent, warm start differs from cold start, wherein the initial search time to lock on the satellites is reduced. Typically, the TTFF for cold start and warm start are, for example, about 100 seconds and about 48 seconds respectively. The above described start modes are predominantly meant for open sky applications.

The next two categories of receiver start modes are hot start and snap start modes. These are used in automotive grade receivers, wherein the receiver has access to additional parameters. Specifically, in hot start, the receiver has access to the latest navigation data, that is, ephemeris data, either stored in a memory from the last power-on, or from an external real time aid. As such, the receiver only needs to obtain the time accurately from the satellite. In case of GPS, the hand over word (HOW) has Z-count information or a time parameter, which repeats once every 6 seconds. Thus, with sub-frame synchronization, the receiver will be able to collect time and in turn make measurements. Snap start is the best case for TTFF, wherein all the receiver parameters including clock parameters of the receiver are available at power-on. This category of receiver makes a fundamental assumption that the receiver was recently powered on and the clock estimate propagated internally is valid for signal processing purposes. With this, the receiver achieves instantaneous lock and with word synchronization, the receiver computes user position. Typically, the TTFF for hot start and snap start modes are, for example, about 8 seconds to about 14 seconds, and 2 seconds respectively. The hot start and snap start modes are used for indoor and high sensitivity applications and are receiver dependent. Since the TTFF is comparatively large in both cold and warm start modes, there is a need for minimizing the TTFF in open sky signal acquisition modes. The drawback with the existing operational systems is that the $T_{eph}$ determines TTFF in cold and warm start modes, a parameter missing in the other two modes.

Consider GPS multi-frequency bands and their signaling with an emphasis on the $T_{eph}$ parameter. Presently, there are 31 GPS satellites with signals transmitted on L1 and L2 frequencies. The SPS service is available only on L1, while PS service is available on both. Furthermore, seven of the 31 satellites transmit the L2C signal and only one transmits the L5 signal. As a part of GPS modernization, it is proposed to have GPS L1C signals. In all, a GPS SPS receiver will have access to signals, for example, ranging codes on four frequency bands. At the same time, apart from GPS M-signals, a military receiver will have access to the above four frequency bands with data and two encrypted channels, that is, L1 and L2, P (Y) codes.

Considering GPS L1, L2C and L5 bands, a top-level navigation data design implements data signal streaming, for example, of 5 sub-frames in 30 seconds in the same sequence, for example, sub-frame 1 to sub-frame 5. L1 was designed in the mid-seventies, while L2C and L5 are recent developments. As such, the L2C and L5 have advanced features and have taken into consideration the limitations of L1. Moreover, some of the recent developments in signal processing have also been accounted for in the signal design. Given the extensive use of the legacy L1 signal and with millions of units being produced, a change in the signal structure is not feasible. Currently in GPS, the navigation data rate is 50 bits per second (bps). With the existing GPS multi frequency of operation, the worst case $T_{eph}$ takes about 30 seconds in either single or dual frequencies, or even with military receivers. In order to improve $T_{eph}$, either the data rate has to be increased or the number of data bits of navigation data should be reduced. In a co-pending patent application titled "Navigation Data Structure Generation and Data Transmission for Optimal Time to First Fix", an attempt has been made to optimize and structure the navigation data into four sub frames, where it has been demonstrated that $T_{eph}$ can be optimized to about 24 seconds. However, there is a need to achieve lower TTFF without increasing the data rate or without drastically increasing the transmitted signal power.

Therefore, there is a long felt but unresolved need for a satellite navigation receiver, method and navigation data signal configurations for enhancing the time to first fix (TTFF) parameter for precise service (PS) users and special positioning service (SPS) users in a satellite navigation system by exploiting the advantages of code diversity and carrier diversity in navigation signals.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The satellite navigation receiver, method and navigation data signal configurations disclosed herein addresses the above stated need for enhancing a time to first fix (TTFF) parameter of precise service (PS) users and special positioning service (SPS) users in a satellite navigation system by exploiting the advantages of code diversity and carrier diversity in navigation signals. The satellite navigation receiver disclosed herein comprises a radio frequency translator, one or more correlator blocks, and a navigation data processor. The radio frequency translator comprises two input channels for receiving navigation signals over one or more of a first carrier frequency, for example, L5 frequency and a second carrier frequency, for example, S1 frequency from one or more satellites. The radio frequency translator conditions the navigation signals over one or more of the first carrier frequency and the second carrier frequency. In an embodiment, the satellite navigation receiver further comprises one or more down-converters for down-converting the conditioned navigation signals over one or more of the first carrier frequency and the second carrier frequency.

The correlator blocks of the satellite navigation receiver disclosed herein comprise a predetermined number of correlator channels configured for the first carrier frequency and the second carrier frequency. The predetermined number of the correlator channels is divided for parallel collection of sub-frames of navigation data from the navigation signals across one or more operation service codes. The operation service codes comprise, for example, navigation data encodings for services of operation, namely, a precise service (PS) and a special positioning service (SPS). Precise service (PS) refers to an operation service mode configured to cater the needs of specific users. Special positioning service (SPS) refers to an operation service mode configured to cater to the needs of civilian users.

In a code diversity mode, the parallel collection of the sub-frames of navigation data comprises parallel collection of the sub-frames of navigation data across one or more operation service codes and on the first carrier frequency or the second carrier frequency. In a carrier diversity mode, the sub-frames of navigation data are parallelly collected across the first carrier frequency and the second carrier frequency and on one of the operation service codes. In a hybrid mode, the sub-frames of navigation data are parallelly collected across the first carrier frequency and the second carrier frequency and across the operation service codes. The navigation data processor processes the parallelly collected sub-frames of navigation data to estimate the position of the satellite navigation receiver. The parallel collection of the sub-frames of navigation data across the first carrier frequency and the second carrier frequency and/or across the operation service codes reduces the time to first fix (TTFF) parameter of the position of the satellite navigation receiver.

The navigation data processor comprises an acquisition module, a tracking module, a satellite database manager, and a position computation module. The acquisition module acquires the navigation signals from all visible satellites and estimates coarse code phase and carrier Doppler frequency of the visible satellites. The acquisition module passes the estimated code phase and carrier Doppler frequency of the visible satellites to the tracking module. The tracking module in turn tracks each satellite precisely to generate the navigation data bits based on the estimated code phase and carrier Doppler frequency. The satellite database manager frames the navigation data based on the data bit demodulation. The position computation module estimates the position of the satellite navigation receiver based on the navigation data.

In an embodiment, the correlator blocks comprise parallel correlator buffers configured for correlating locally generated signals with the navigation signals across one or more operation service codes and on the first carrier frequency or the second carrier frequency. In another embodiment, the parallel correlator buffers are configured for correlating locally generated signals with the navigation signals across the first carrier frequency and the second carrier frequency and on one of the operation service codes. In another embodiment, the parallel correlator buffers are configured for correlating locally generated signals with the navigation signals across the first carrier frequency and the second carrier frequency and across the operation service codes.

According to the method and navigation data signal configurations disclosed herein, each of the correlator channels of the correlator blocks collects the sub-frames of navigation data in one or more predefined sequences. The collection of the sub-frames of navigation data in the predefined sequences ensures that collection time of ephemeris data ($T_{eph}$) is reduced based on the collection of the sub-frames of navigation data across one of the operation service codes on a single carrier frequency, across the first carrier frequency and the second carrier frequency, or a combination thereof.

In an embodiment of the satellite navigation receiver disclosed herein, the radio frequency translator comprises multiple input channels for receiving navigation signals over M carrier frequencies from one or more satellites. The radio frequency translator conditions the navigation signals over M carrier frequencies. In an embodiment, the satellite navigation receiver further comprises one or more down-converters for down-converting the conditioned navigation signals over the M carrier frequencies. The correlator blocks of the satellite navigation receiver comprise a predetermined number of correlator channels configured for the M carrier frequencies. The predetermined number of the correlator channels is divided for parallel collection of sub-frames of navigation data from the navigation signals across N operation service codes.

In a code diversity mode, the parallel collection of the sub-frames of navigation data comprises parallel collection of the sub-frames of navigation data across N operation service codes and on one of the M carrier frequencies. In a carrier diversity mode, the sub-frames of navigation data are parallelly collected across the M carrier frequencies and on one of the N operation service codes. In a hybrid mode, the sub-frames of navigation data are parallelly collected across the M carrier frequencies and across the N operation service codes. The navigation data processor processes the parallelly collected sub-frames of navigation data to estimate position of the satellite navigation receiver. The parallel collection of the sub-frames of navigation data across the M carrier frequencies reduces the TTFF parameter of the position of the satellite navigation receiver by a factor of M. The parallel collection of the sub-frames of navigation data across the N operation service codes reduces the TTFF parameter by a factor of N. The parallel collection of the sub-frames of navigation data across both the M carrier frequencies and the N operation service codes reduces the TTFF parameter by a factor of M×N.

Also, disclosed herein is a system and method for generating and/or transmitting navigation signals across multiple operation service codes, across multiple carrier frequencies, or across a combination thereof. The system disclosed herein comprises an intermediate frequency (IF) signal generator and one or more radio frequency translators. The intermediate frequency signal generator generates intermediate frequency (IF) signals comprising data, for example, in sub-frames of a navigation data structure disclosed in the co-pending patent application titled "Navigation Data Structure Generation and Data Transmission for Optimal Time to First Fix", code and carrier at baseband. The IF signal generator comprises one or more operation service code generators, one or more intermediate frequency (IF) carrier generators, one or more adders, and one or more modulators.

The operation service code generators generate one or more of the multiple operation service codes. The IF carrier generators generate in-phase (sine) and quadrature phase (cosine) intermediate frequency (IF) carrier signals corresponding to one or more of the multiple carrier frequencies. The adders add the sub-frames of navigation data with one or more of the multiple operation service codes for generating service code modulated navigation data. The modulators modulate the service code modulated navigation data with the in-phase and quadrature phase IF carrier signals corresponding to one or more of the multiple carrier frequencies for generating intermediate frequency signals. The radio frequency translators perform up-conversion of the generated intermediate frequency signals to yield simulated navigation signals across multiple operation service codes, across multiple carrier frequencies, or across a combination thereof.

The system disclosed herein transmits the navigation signals across multiple operation service codes, across multiple carrier frequencies, or across a combination thereof, to the satellite navigation receiver disclosed herein. The sub-frames of navigation data are transmitted to the satellite navigation receiver in one or more predefined sequences across each of the multiple operation service codes, across each of the multiple carrier frequencies, or across a combination of the carrier frequencies and the operation service codes. The transmission of the sub-frames of navigation data in one or more of the predefined sequences to the satellite navigation receiver optimizes collection time of ephemeris data ($T_{eph}$) of the navigation data by the satellite navigation receiver.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein.

FIG. 2 exemplarily illustrates tables showing data availability on different frequency bands.

FIG. 3 exemplarily illustrates a possible Indian regional navigational satellite system (IRNSS) signaling scheme.

FIG. 14 exemplarily illustrates a table showing signal simulation parameters in various modes.

DETAILED DESCRIPTION OF THE INVENTION

Figure 1:
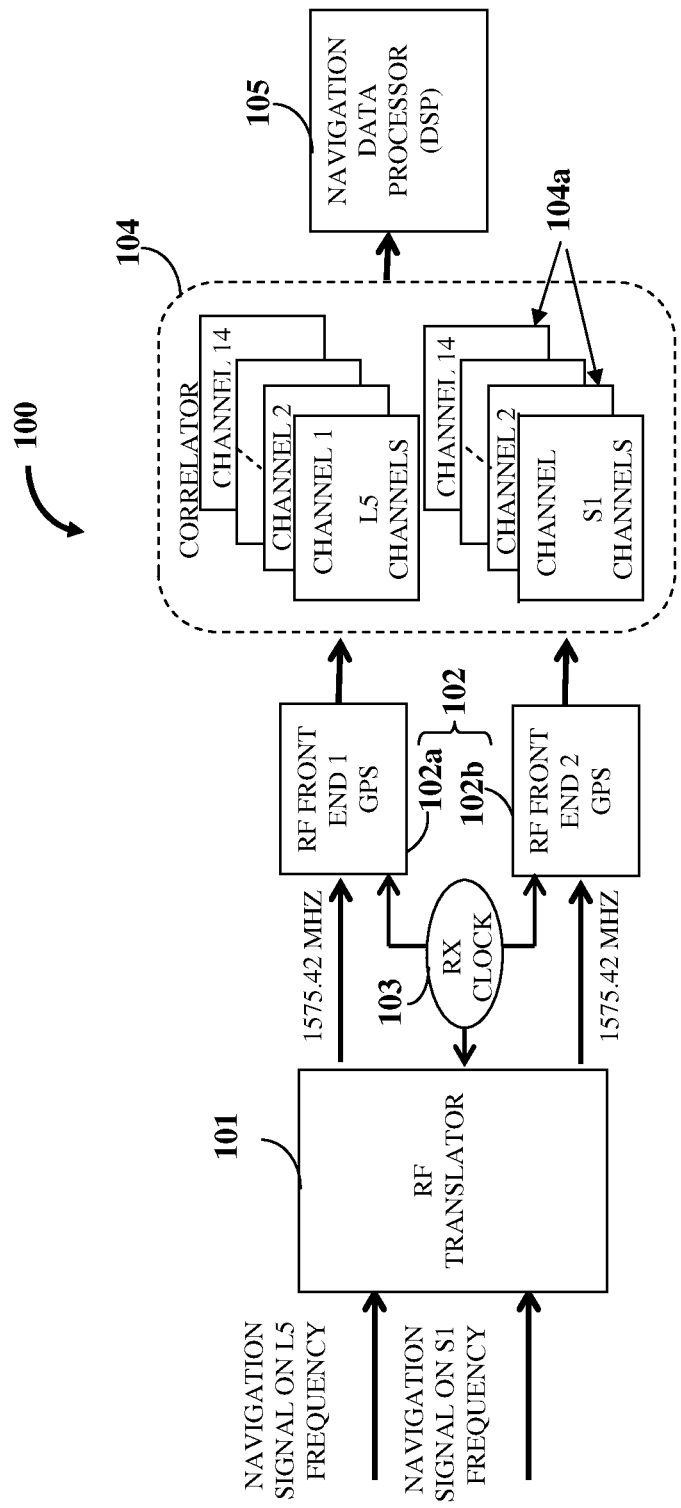
FIG. 1 illustrates a satellite navigation receiver for reducing a time to first fix parameter based on code diversity and carrier diversity.

FIG. 1 illustrates a satellite navigation receiver 100 for reducing a time to first fix (TTFF) parameter based on code diversity and carrier diversity. As used herein, code diversity refers to modulation, generation or transmission of navigation data on different orthogonal ranging codes but on a given carrier frequency. Also, as used herein, carrier diversity refers to modulation, generation or transmission of navigation data on the same ranging code but on different carrier frequencies. The TTFF parameter is computed, for example, by a cumulative addition of five different time components as specified in the equation below:

$$TTFF = T_b + T_a + T_{bs} + T_{eph} + T_{pos}$$

where $T_b$ is a boot-up time for the receiver application;
$T_a$ is the time taken for acquiring navigation signals from visible satellites and estimating coarse code phase and carrier Doppler frequency of the visible satellites;
$T_{bs}$ is the time taken for bit synchronization;
$T_{eph}$ is the time for collecting ephemeris data; and
$T_{pos}$ is the time taken for computing user position.

The satellite navigation receiver 100 disclosed herein comprises a radio frequency (RF) translator 101, one or more correlator blocks 104, and a navigation data processor 105. The radio frequency translator 101 comprises two input channels for receiving navigation signals over one or more of a first carrier frequency, for example, L5 frequency and a second carrier frequency, for example, S1 frequency from one or more satellites. The radio frequency translator 101 conditions the navigation signals over one or more of the first carrier frequency and the second carrier frequency. In an embodiment, the satellite navigation receiver 100 further comprises one or more down-converters 102, for example, RF front end 1 102a and RF front end 2 102b, exemplarily illustrated in FIG. 1, for down-converting the conditioned navigation signals over one or more of the first carrier frequency and the second carrier frequency. A common clock 103 is used across all the stages of down-conversion including during functions performed by the RF translator 101.

The correlator blocks 104 comprise a predetermined number of correlator channels 104a configured for the first carrier frequency and the second carrier frequency. The predetermined number of the correlator channels 104a is divided for parallel collection of sub-frames of navigation data from the navigation signals across one or more operation service codes. The operation service codes comprise, for example, navigation data encodings for a precise service (PS) and a special positioning service (SPS). Precise service (PS) refers to an operation service mode configured to cater to the needs of specific users. Special positioning service (SPS) refers to an operation service mode configured to cater to the needs of civilian users.

In a code diversity mode, the parallel collection of the sub-frames of navigation data comprises parallel collection of the sub-frames of navigation data across one or more operation service codes and on the first carrier frequency or the second carrier frequency. In a carrier diversity mode, the sub-frames of navigation data are parallelly collected across the first carrier frequency and the second carrier frequency and on one of the operation service codes. In a hybrid mode, the sub-frames of navigation data are parallelly collected across the first carrier frequency and the second carrier frequency and across the operation service codes. The navigation data processor 105 processes the parallelly collected sub-frames of navigation data to estimate position of the satellite navigation receiver 100. The parallel collection of the sub-frames of navigation data across the first carrier frequency and the second carrier frequency and/or across the operation service codes reduces or optimizes the time to first fix (TTFF) parameter of the position of the satellite navigation receiver 100.

According to the satellite navigation receiver 100 and navigation data signal configuration disclosed herein, each of the correlator channels 104a of the correlator blocks 104 collects the sub-frames of navigation data in one or more predefined sequences. The collection of the sub-frames of navigation data in one or more predefined sequences ensures that collection time of ephemeris data ($T_{eph}$) of the navigation data is reduced based on whether the sub-frames of navigation data are collected across the operation service codes on a single carrier frequency, across the first carrier frequency and the second carrier frequency, or across a combination thereof.

In an embodiment of the satellite navigation receiver 100 disclosed herein, the radio frequency (RF) translator 101 comprises multiple input channels for receiving navigation signals over M carrier frequencies from one or more satellites. The radio frequency translator 101 conditions the navigation signals over the M carrier frequencies. In an embodiment, the satellite navigation receiver 100 further comprises one or more down-converters 102a and 102b for down-converting the conditioned navigation signals over the M carrier frequencies. The correlator blocks 104 comprise a predetermined number of correlator channels 104a configured for the M carrier frequencies. The predetermined number of the correlator channels 104a is divided for parallel collection of sub-frames of navigation data from the navigation signals across N operation service codes. In a code diversity mode, the parallel collection of the sub-frames of navigation data comprises parallel collection of the sub-frames of navigation data across N operation service codes and on one of the M carrier frequencies. In a carrier diversity mode, the sub-frames of navigation data are parallelly collected across the M carrier frequencies and on one of the N operation service codes. In a hybrid mode, the sub-frames of navigation data are parallelly collected across the M carrier frequencies and across the N operation service codes.

The navigation data processor 105 processes the parallelly collected sub-frames of navigation data to estimate position of the satellite navigation receiver 100. The parallel collection of the sub-frames of navigation data across the M carrier frequencies reduces the time to first fix (TTFF) parameter of the position of the satellite navigation receiver 100 by a factor of M. The parallel collection of the sub-frames of navigation data across the N operation service codes reduces the time to first fix parameter by a factor of N. The parallel collection of the sub-frames of navigation data across both the M carrier frequencies and the N operation service codes reduces the time to the first fix parameter by a factor of M×N.

The Indian regional navigational satellite system (IRNSS) has proposed to run a dual frequency of operation for both precise service (PS) and special positioning service (SPS) users. The nature of the navigation data made from a design perspective in lines with GPS L1 (1575.42 megahertz (MHz)) and L2C (1227.60 MHz) is exemplarily illustrated in the table of FIG. 2.

FIG. 2 exemplarily illustrates tables showing data availability on different frequency bands. The navigation data structure generated in the co-pending patent application titled "Navigation Data Structure Generation and Data Transmission for Optimal Time to First Fix" is taken as the basis for the navigation data signaling scheme. Similar to GPS, the navigation data rate, for example, of at least about 50 bits per second (bps) or more is considered in SPS and PS of the Indian regional navigational satellite system (IRNSS). In addition, the IRNSS PS code acquisition is enhanced by the hand over word (HOW) of SPS. This implies that PS users have access to the navigation data of all the four blocks of the table exemplarily illustrated in FIG. 2. According to the satellite navigation receiver 100 exemplarily illustrated in FIG. 1 and the method disclosed herein, the following navigation data design architectures are implemented for a satellite navigation system, namely, code diversity, carrier diversity and a hybrid mode that combines code diversity and carrier diversity.

FIG. 3 exemplarily illustrates a possible Indian regional navigational satellite system (IRNSS) signaling scheme. The IRNSS is considered to be a dual use system. One of the main reasons for having a dual frequency of operation is the possibility of estimating the ionosphere delay. With the signaling scheme exemplarily illustrated in FIG. 3, the need is met even for civilian users, where measurements can be derived from a pilot signal. The table shown in FIG. 3 represents a legacy GPS L1 and L2 architecture for civilian users barring ranging code on L2 to a large extent. A squaring technique on L2 yields measurements but with some degradation. However, the pilot signal serves as a medium for independent measurements without any degradation. With the table shown in FIG. 3 being a possible candidate for the signaling scheme, the satellite navigation receiver 100 exemplarily illustrated in FIG. 1 and the method disclosed herein describe a scheme to achieve an optimal TTFF for PS users on L5. Based on the data sheets of PS receiver manufacturers, the navigation data structure on the PS service of GPS L1 typically enables reception of five sub-frames within about 30 seconds (s). In order to enhance the TTFF of PS users of the IRNSS, the navigation data configuration exemplarily illustrated in FIG. 4 is implemented for the PS users.

Figure 4:
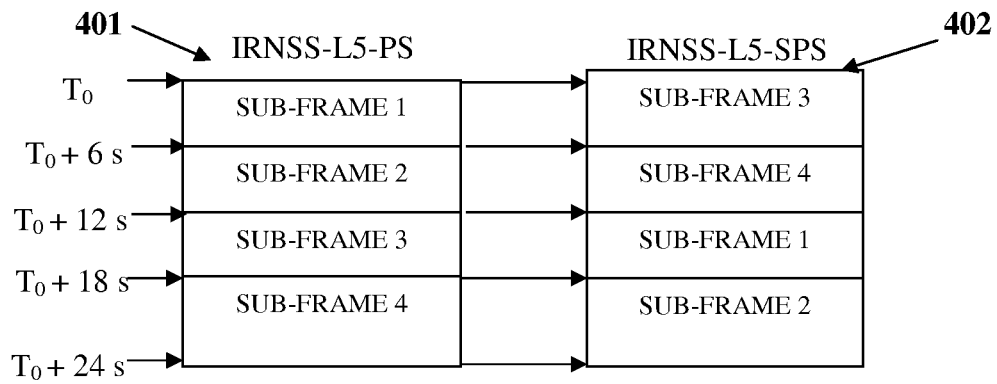
FIG. 4 exemplarily illustrates a navigation data signal configuration based on code diversity.

FIG. 4 exemplarily illustrates a navigation data signal configuration based on code diversity. The satellite navigation receiver 100, exemplarily illustrated in FIG. 1, maintains two parallel channels per satellite for navigation data extraction. The configuration for navigation data transmission exemplarily illustrated in FIG. 4 effectively reduces $T_{eph}$ to half against an existing data structure in GPS L1. As exemplarily illustrated in FIG. 4, the extraction of navigation data by the satellite navigation receiver 100 across PS and SPS operation service codes adopts a definite sequencing to ensure that all the four data sub-frames are extracted within, for example, about 12 seconds. For example, the extraction of sub-frames of navigation data over the PS operation service code on few of the channels 104a exemplarily illustrated in FIG. 1, follows the sequence sub-frame 1-sub-frame 2-sub-frame 3-sub-frame 4 401, while the extraction of sub-frames of navigation data over the SPS operation service code on the other channels 104a follows the sequence sub-frame 3-sub-frame 4-sub-frame 1-sub-frame 2 402. This is under the assumption that irrespective of when the satellite navigation receiver 100 is powered on, $T_{eph}$ will effectively be, for example, about 12 seconds. In FIG. 4, reduction of $T_{eph}$ to 12 seconds is theoretically established for the PS users. Using the table shown in FIG. 2 as the basis for the navigation data transmission, the technique elaborated with reference to FIG. 4 can be extended to civilian users.

Figure 5:
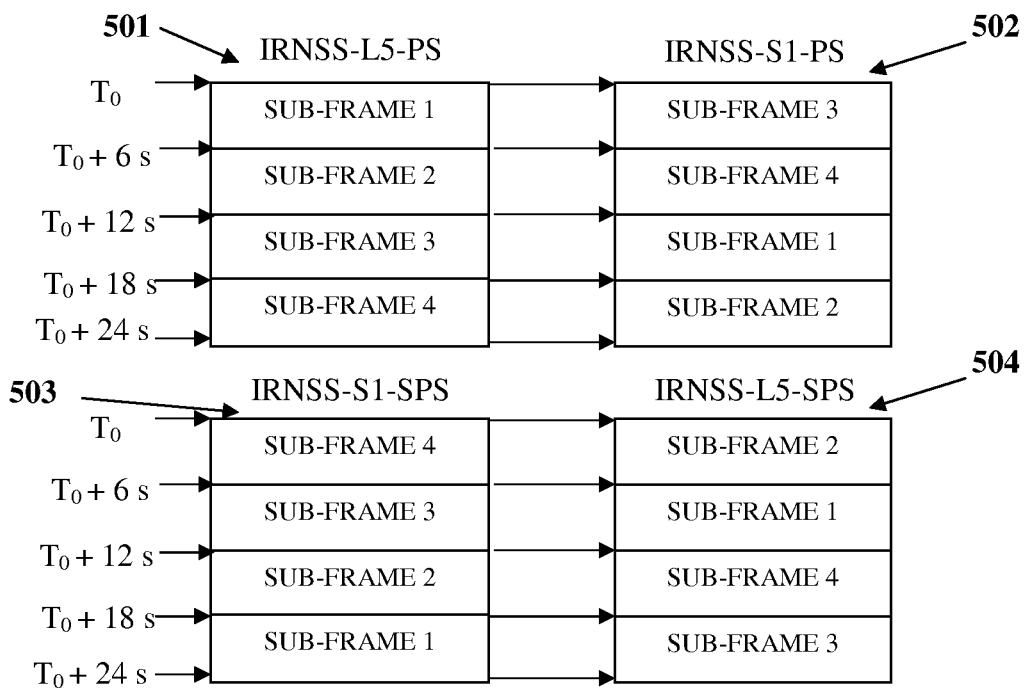
FIG. 5 exemplarily illustrates a navigation data signal configuration based on carrier diversity for a precise service (PS) and a special positioning service (SPS).

FIG. 5 exemplarily illustrates a navigation data signal configuration based on carrier diversity for a precise service (PS) and a special positioning service (SPS). That is, FIG. 5 exemplarily illustrates a possible scheme of navigation data transmission based on carrier diversity for the SPS and PS users. In either case, $T_{eph}$ is theoretically reduced, for example, to about 12 seconds. As exemplarily illustrated in FIG. 5, two possible sub-frame sequences have been determined to ensure that $T_{eph}$ remains the same, independent of an instant of power-on of the satellite navigation receiver 100 exemplarily illustrated in FIG. 1. As exemplarily illustrated in FIG. 5, the extraction of navigation data by the satellite navigation receiver 100 across each of the carrier frequencies adopts a definite sequencing to ensure that all the four data sub-frames are extracted within about 12 seconds. For example, the extraction of sub-frames of navigation data of the PS code on the L5 carrier frequency follows the sequence sub-frame 1-sub-frame 2-sub-frame 3-sub-frame 4 501, while the extraction of sub-frames of navigation data of the PS code on the S1 carrier frequency follows the sequence sub-frame 3-sub-frame 4-sub-frame 1-sub-frame 2 502. In another example, the extraction of sub-frames of navigation data of the SPS code on the S1 carrier frequency follows the sequence sub-frame 4-sub-frame 3-sub-frame 2-sub-frame 1 503, while the extraction of sub-frames of navigation data of the SPS code on the L5 carrier frequency follows the sequence sub-frame 2-sub-frame 1-sub-frame 4-sub-frame 3 504. Using the table exemplarily illustrated in FIG. 2 and based on the findings of code diversity and carrier diversity, the method disclosed herein provides an optimal architecture for PS users.

Figure 6:
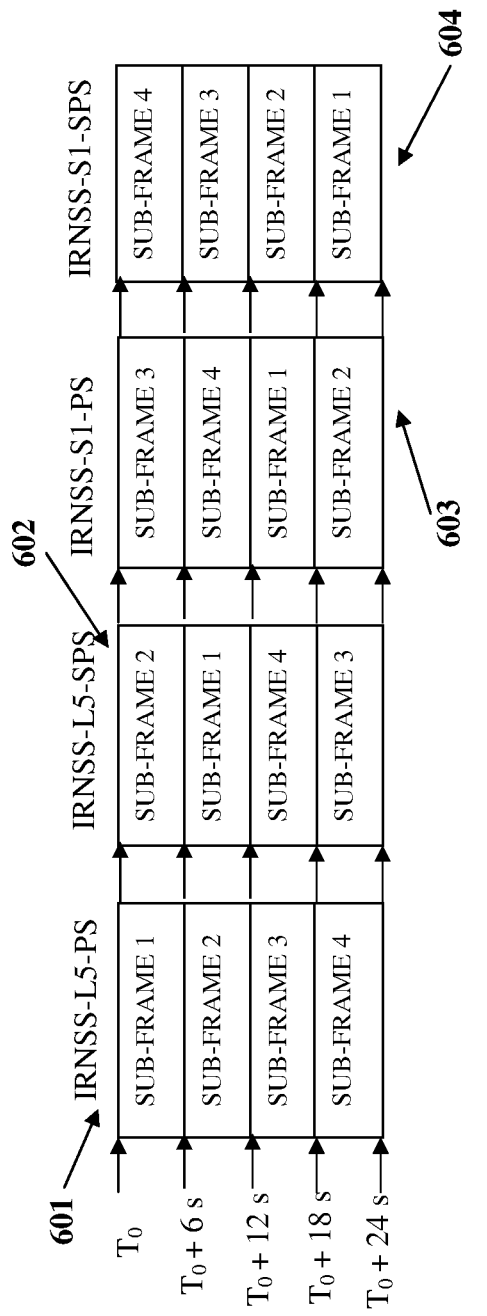
FIG. 6 exemplarily illustrates a navigation data signal configuration based on a hybrid combination of code diversity and carrier diversity.

FIG. 6 exemplarily illustrates a navigation data signal configuration based on a hybrid combination of code diversity and carrier diversity. Consider an example where a PS satellite navigation receiver 100, exemplarily illustrated in FIG. 1, has four independent processing data channels 104a per satellite. The navigation data is configured in such a manner that the benefits of code diversity and carrier diversity are met by the PS users and the SPS users independently, in a case where four channels 104a per satellite are not available for data processing. The navigation data signal is configured such that the $T_{eph}$ for PS users is accomplished within about 6 seconds (s) as exemplarily illustrated in FIG. 6.

As exemplarily illustrated in FIG. 6, the extraction of navigation data across the combination of the carrier frequencies and the operation service codes adopts a definite sequencing to ensure that all the four data sub-frames are extracted within about 6 seconds. For example, the extraction of sub-frames of navigation data of the PS code on the L5 carrier frequency follows the sequence sub-frame 1-sub-frame 2-sub-frame 3-sub-frame 4 601, the extraction of sub-frames of navigation data of the SPS code on the L5 carrier frequency follows the sequence sub-frame 2-sub-frame 1-sub-frame 4-sub-frame 3 602, the extraction of sub-frames of navigation data of the PS code on the S1 carrier frequency follows the sequence sub-frame 3-sub-frame 4-sub-frame 1-sub-frame 2 603, and the extraction of sub-frames of navigation data of the SPS code on the S1 carrier frequency follows the sequence sub-frame 4-sub-frame 3-sub-frame 2-sub-frame 1 604.

Figure 7:
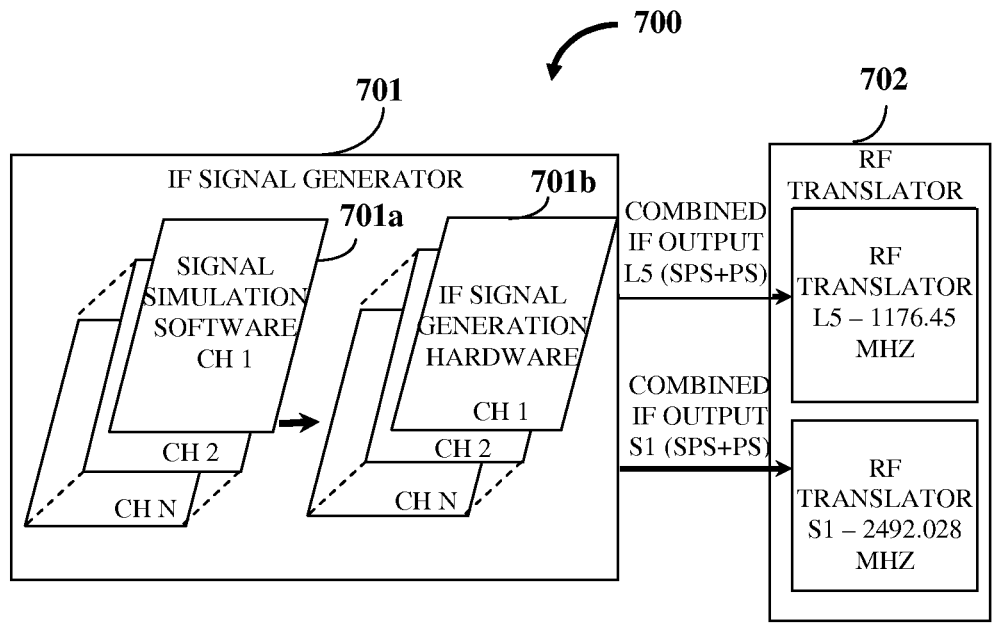
FIG. 7 exemplarily illustrates a system for generating navigation signals across multiple operation service codes.
Figure 10:
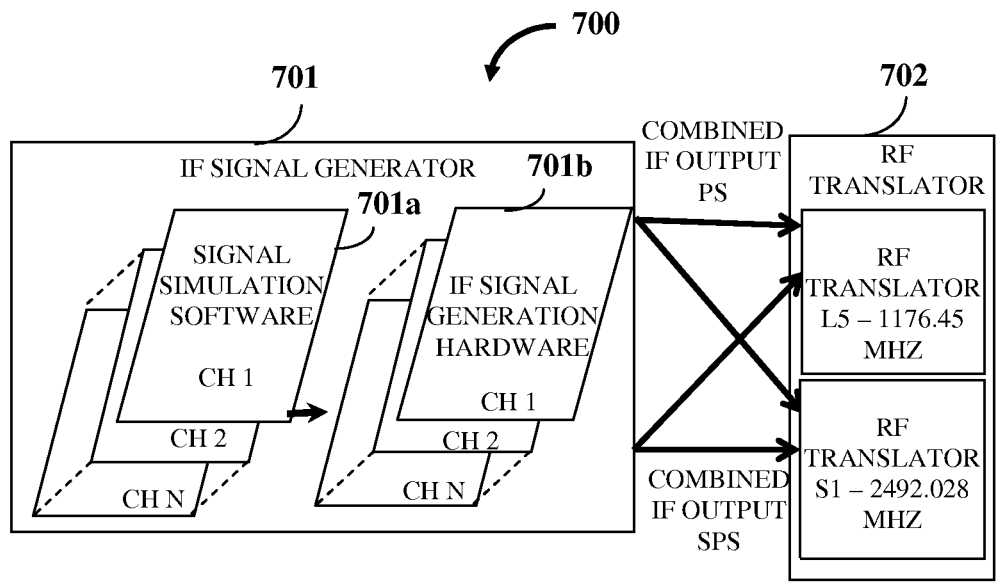
FIG. 10 exemplarily illustrates a system for generating navigation signals across multiple carrier frequencies.

FIG. 7 exemplarily illustrates a system 700 for generating navigation signals across multiple operation service codes. FIG. 7 and FIG. 10 represent a test system 700, used for generating navigation signals according to the navigation data signal configurations exemplarily illustrated in FIGS. 4-6. As recognized by a person of ordinary skill in the art, the system 700 exemplarily illustrated in FIG. 7 and FIG. 10 also represents the actual transmitter configuration on the satellites for transmitting real navigations signals according to the navigation data signal configurations exemplarily illustrated in FIGS. 4-6. FIG. 7 exemplarily illustrates a generic high-level block diagram of an N-channel signal generator test system 700 having modules to simulate radio frequency (RF) signals with the code, carrier and hybrid modes as disclosed in the detailed description of FIGS. 4-6.

The system 700, exemplarily illustrated in FIG. 7, comprises an intermediate frequency (IF) signal generator 701 and one or more radio frequency translators 702. The IF signal generator 701 comprises signal simulation software 701a and IF signal generation hardware 701b for generating intermediate frequency signals. The IF signal generator 701 generates L5 and S1 signals, which are further translated to L5 and S1 bands using the radio frequency (RF) translators 702 also referred to as up-converter modules. For code diversity, navigation signals are generated across multiple operation service codes on a single carrier frequency. The first version of the signal simulator software 701a generates an RF signal corresponding to L5 with ranging codes available to both PS and SPS services in accordance with the following equation:

$$A_{IF-L5}(t) = \sum_{n=1}^{7} ((CA_{SPS-n}(t) \oplus D_n(t)) * \cos(\omega_{IF}t)) + \sum_{n=1}^{7} ((CA_{PS-n}(t) \oplus D_n(t)) * \sin(\omega_{IF}t))$$

Figure 8:
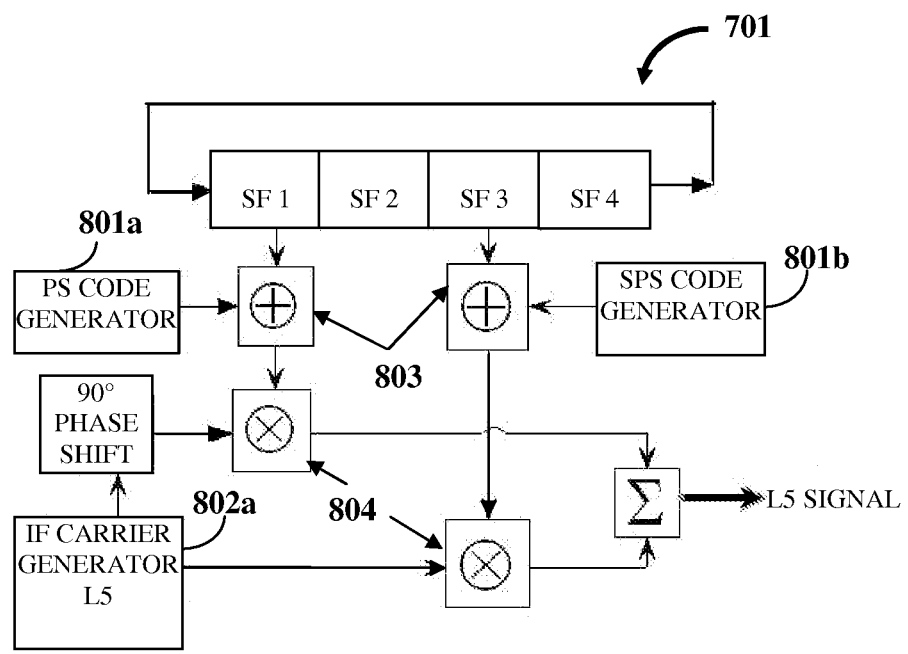
FIG. 8 exemplarily illustrates a block diagram of an intermediate frequency (IF) signal generator for code diversity.

FIG. 8 exemplarily illustrates a block diagram of an intermediate frequency (IF) signal generator 701 for code diversity. The intermediate frequency signal generator 701 comprises one or more operation service code generators 801a and 801b, one or more intermediate frequency carrier generators 802a, one or more adders 803, and one or more modulators 804. The operation service code generators 801a and 801b, for example, a PS code generator 801a and/or a SPS code generator 801b generate one or more operation service codes. The intermediate frequency carrier generator 802a generates in-phase or sine and quadrature phase or cosine intermediate frequency (IF) carrier signals corresponding to one or more of the multiple carrier frequencies. The adders 803 add sub-frames of navigation data with one or more of the multiple operation service codes for generating service code modulated navigation data.

The generated navigation data is modulo-2 added with the operation service codes, for example, PS codes and SPS codes. The modulators 804 modulate the service code modulated navigation data with the in-phase and quadrature phase IF carrier signals corresponding to one or more of the multiple carrier frequencies for generating intermediate frequency signals. The service code modulated navigation data is binary phase shift keying (BPSK) modulated with the in-phase or sine and the quadrature phase or cosine IF carriers, for example, at 20 MHz. Subsequently, the IF carrier signal is translated to the L5 band. The generated IF signal is further up-converted to the respective RF frequencies using a radio frequency mixer in the RF translator 702 exemplarily illustrated in FIG. 7. The local oscillator (LO) signals used for L5 RF up-conversion are as follows:

$$A_{LO-L5}(t) = Ae^{j\omega LO-L5 t}$$

The final RF signal at L5 band after suitable filtering is as follows:

$$A_{RF-L5}(t) = A_{IF-L5}(t) * A_{LO-L5}(t)$$

Figure 9:
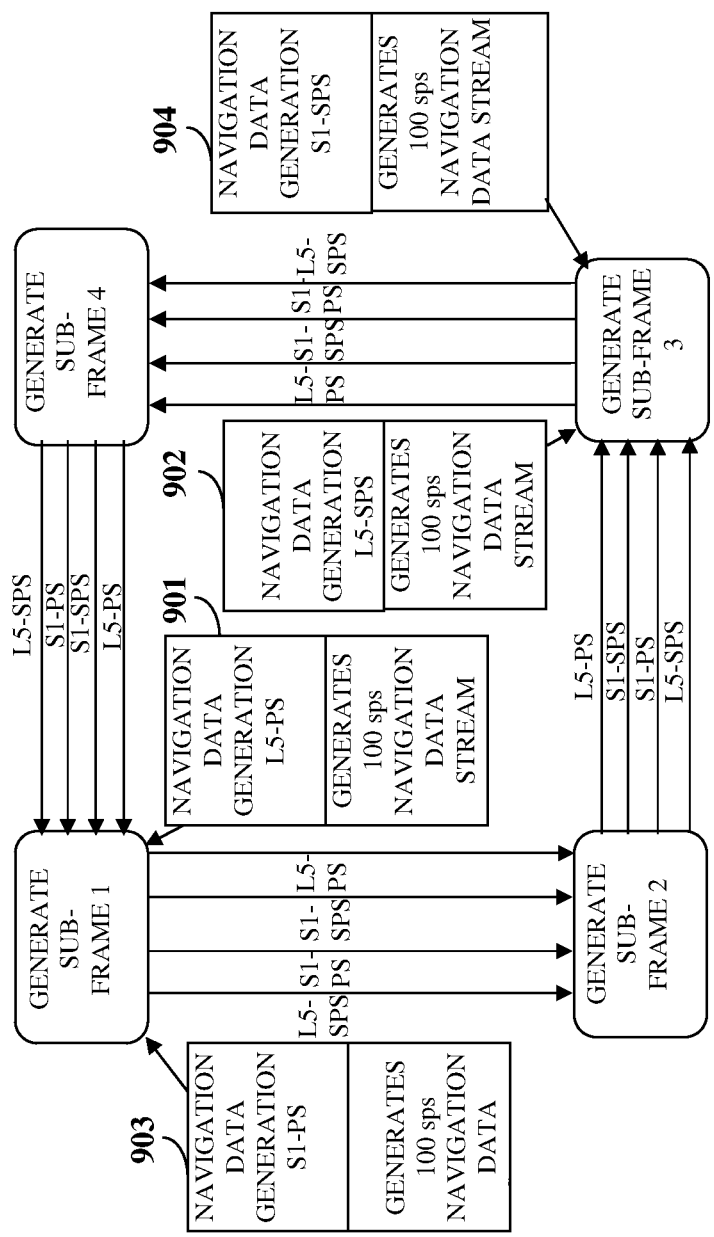
FIG. 9 exemplarily illustrates an algorithmic flow of navigation data generation for code diversity.

FIG. 9 exemplarily illustrates an algorithm flow of navigation data generation for code diversity. FIG. 9 illustrates a navigation data state at any given instant of time and the flow of data from one state or sub-frame to another. The flow diagram depicts the state of the navigation data sub-frame being transmitted across the PS and SPS service at a given instant of time. FIG. 9 further illustrates data patterning for code diversity as shown and disclosed in the detailed description of FIG. 4. For example, generation 901 of the navigation data sub-frames for the PS code on L5 frequency follows the sequence sub-frame 1-sub-frame 2-sub-frame 3-sub-frame 4 401 as indicated by arrows in FIG. 9, while the generation 902 of the navigation data sub-frames for the SPS code on L5 frequency follows the sequence sub-frame 3-sub-frame 4-sub-frame 1-sub-frame 2 402 as indicated by arrows in FIG. 9. In another example, generation 903 of the navigation data sub-frames for the PS code on S1 frequency follows the sequence sub-frame 1-sub-frame 2-sub-frame 3-sub-frame 4

401 as indicated by the arrows in FIG. 9, while the generation 904 of the navigation data sub-frames for the SPS code on S1 frequency follows the sequence sub-frame 3-sub-frame 4-sub-frame 1-sub-frame 2 402 as indicated by the arrows in FIG. 9.

FIG. 10 exemplarily illustrates a system 700 for generating navigation signals across multiple carrier frequencies in the carrier diversity mode. The system 700, exemplarily illustrated in FIG. 10, comprises an intermediate frequency (IF) signal generator 701 and one or more radio frequency translators 702. The IF signal generator 701 comprises a second version of the signal simulation software 701a and the IF signal generation hardware 701b for generating IF signals. To demonstrate carrier diversity, the second version of the signal simulation software 701a has been implemented, which generates the IF signals according to the following equations:

$$A_{IF-L5-RS}(t) = \sum_{n=1}^{7}((CA_{SPS-n}(t) \oplus D_n(t)) * \cos(\omega_{IF}t))$$

$$A_{IF-S1-RS}(t) = \sum_{n=1}^{7}((CA_{RS-n}(t) \oplus D_n(t)) * \cos(\omega_{IF}t))$$

The corresponding RF signal is given by the following equations:

$$A_{RF-L5-RS}(t) = A_{IF-L5-RS}(t) * A_{LO-L5}(t)$$

$$A_{RF-S1-RS}(t) = A_{IF-S1-RS}(t) * A_{LO-S1}(t)$$

Figure 11:
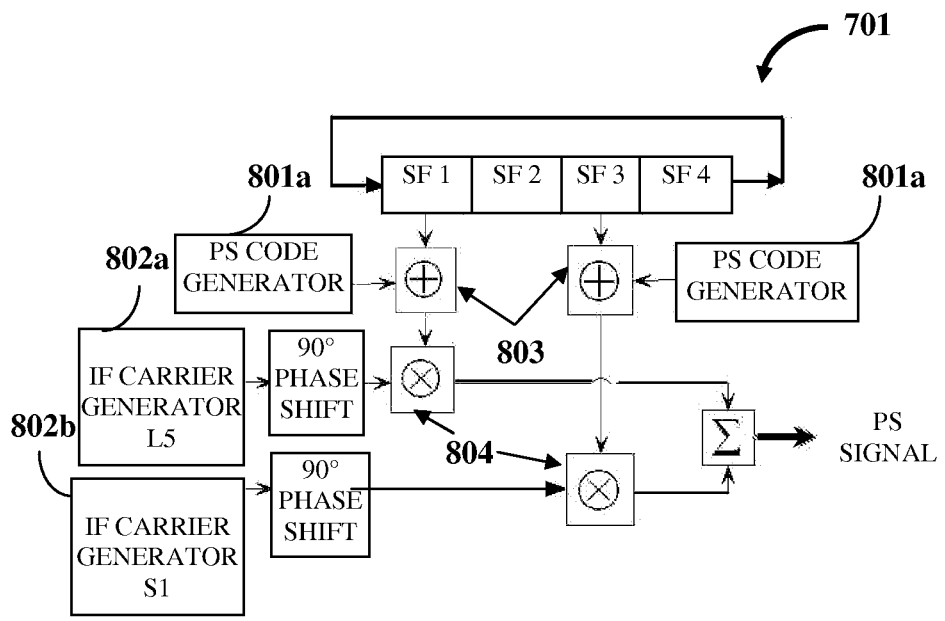
FIG. 11 exemplarily illustrates a block diagram of an intermediate frequency (IF) signal generator for carrier diversity.

The IF signal generated by the IF signal generator 701 with the navigation data configuration disclosed herein is exemplarily illustrated in FIG. 11 and translated to RF by the RF translators 702 as exemplarily illustrated in FIG. 10.

FIG. 11 exemplarily illustrates a block diagram of an intermediate frequency (IF) signal generator 701 for carrier diversity. The intermediate frequency (IF) signal generator 701 comprises PS code generators 801a, intermediate frequency (IF) carrier generators 802a and 802b, adders 803, and modulators 804. The PS code generators 801a generate PS codes. The IF carrier generators 802a and 802b generate in-phase and quadrature phase IF frequency carrier signals corresponding to, for example, the L5 carrier frequency and the S1 carrier frequency respectively. The adders 803 add the sub-frames of navigation data, for example, with the PS codes for generating PS code modulated navigation data. The modulators 804 modulate the PS code modulated navigation data with the in-phase and quadrature phase IF carrier signals corresponding to one or more of the multiple carrier frequencies for generating a PS signal.

Figure 12:
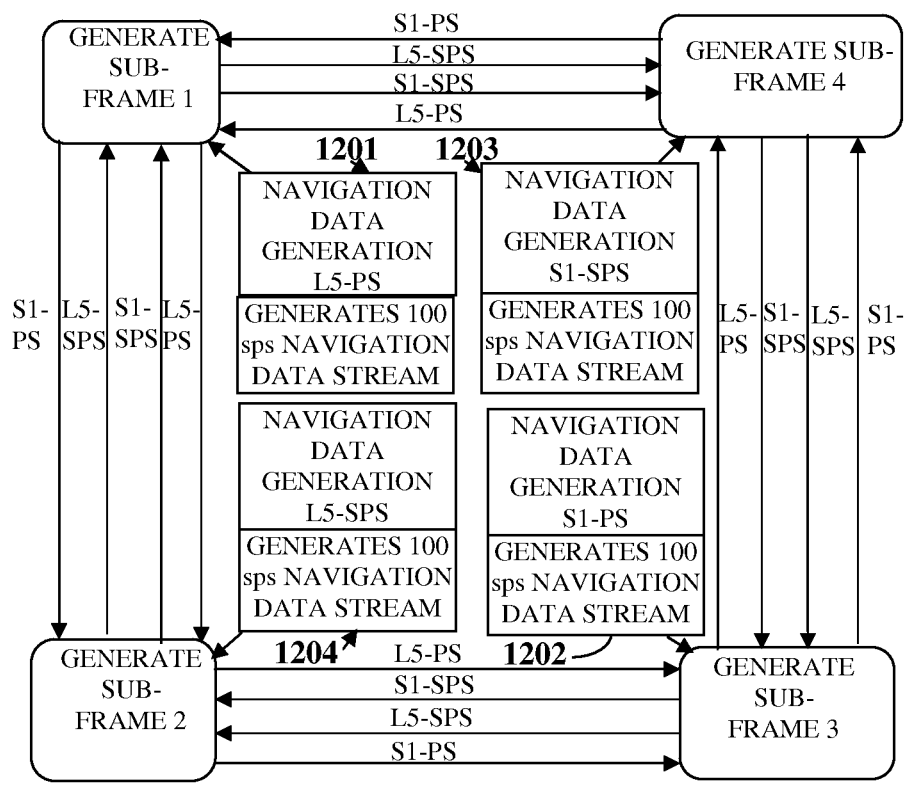
FIG. 12 exemplarily illustrates an algorithmic flow of navigation data generation for carrier diversity.

FIG. 12 exemplarily illustrates an algorithmic flow of navigation data generation for carrier diversity. FIG. 12 exemplarily illustrates a navigation data sub-frame state at any given transmission instant based on carrier diversity. FIG. 12 further exemplarily illustrates the navigation data state at any given instant of time and the flow of data from one state or sub-frame to another. FIG. 12 exemplarily illustrates data patterning for carrier diversity as shown and disclosed in the detailed description of FIG. 5. For example, generation 1201 of the navigation data sub-frames for the PS code on L5 frequency follows the sequence sub-frame 1-sub-frame 2-sub-frame 3-sub-frame 4 501 as indicated by the counter-clockwise arrows in FIG. 12, while the generation 1202 of the navigation data sub-frames for the PS code on S1 frequency follows the sequence sub-frame 3-sub-frame 4-sub-frame 1-sub-frame 2 502 as indicated by the counter-clockwise arrows in FIG. 12. In another example, generation 1203 of the navigation data sub-frames for the SPS code on S1 frequency follows the sequence sub-frame 4-sub-frame 3-sub-frame 2-sub-frame 1 503 as indicated by the clockwise arrows in FIG. 12, while the generation 1204 of the navigation data sub-frames for the SPS code on L5 frequency follows the sequence sub-frame 2-sub-frame 1-sub-frame 4-sub-frame 3 504 as indicated by the clockwise arrows in FIG. 12.

Figure 13:
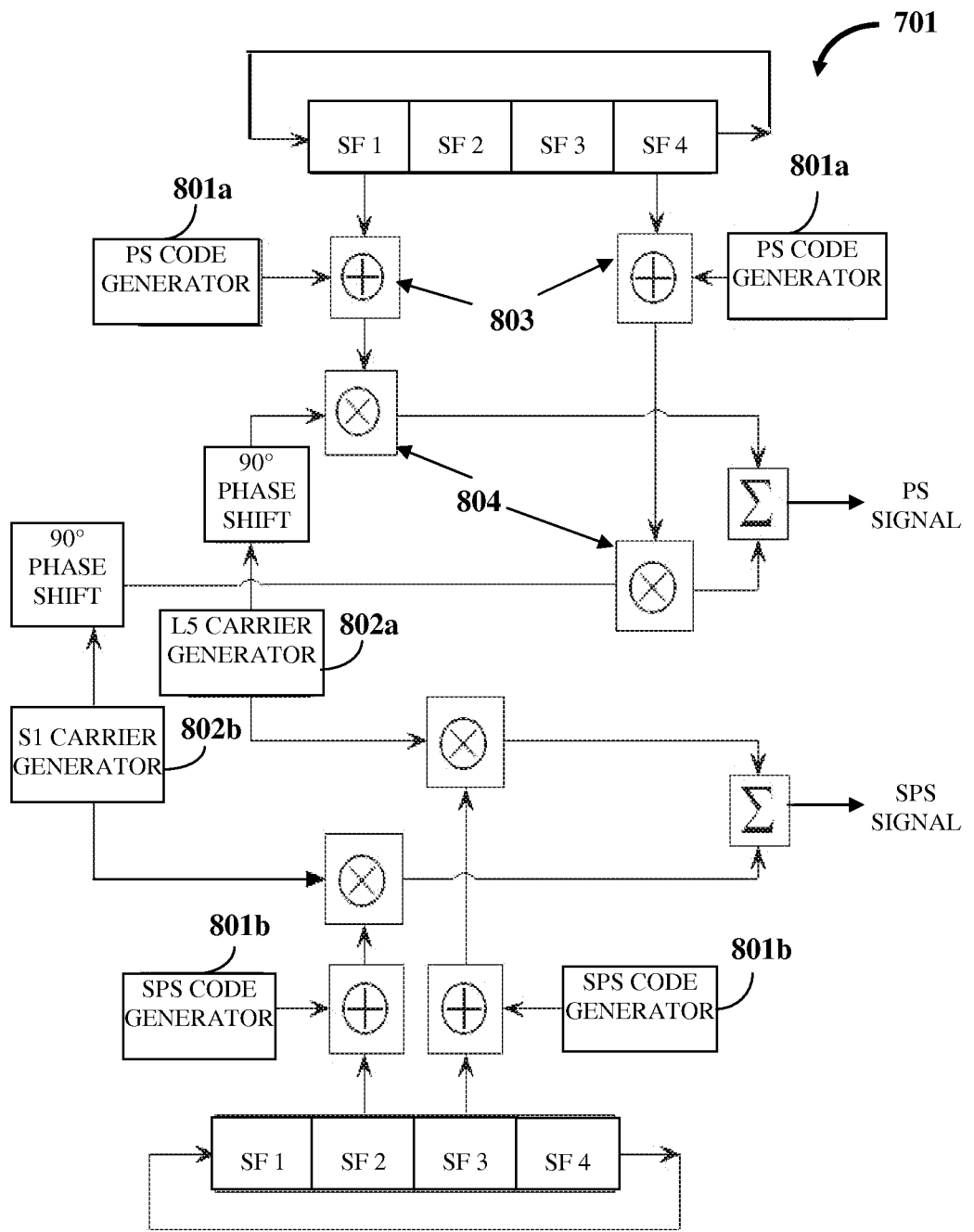
FIG. 13 exemplarily illustrates a block diagram of an intermediate frequency (IF) signal generator for a hybrid combination of code diversity and carrier diversity.

FIG. 13 exemplarily illustrates a block diagram of an intermediate frequency (IF) signal generator 701 for a hybrid combination of code diversity and carrier diversity. The intermediate frequency (IF) signal generator 701 comprises PS code generators 801a, SPS code generators 801b, L5 carrier generators 802a, and S1 carrier generators 802b. The PS code generators 801a generate PS codes. The SPS code generators 801b generate SPS codes. The adders 803 add the sub-frames of navigation data, for example, with PS codes and SPS codes for generating PS code modulated navigation data and SPS code modulated navigation data. The modulators 804 modulate the PS code modulated navigation data and the SPS code modulated navigation data with the in-phase and quadrature phase IF carrier signals corresponding to one or more of the L5 carrier frequency and the S1 carrier frequency, for generating a PS signal and an SPS signal respectively. In case of the hybrid combination of code diversity and carrier diversity, the signal for a third version of the signal simulation software (not shown) is generated based on the following equations:

$$A_{IF-L5}(t) = \sum_{n=1}^{7}((CA_{SPS-n}(t) \oplus D_n(t)) * \cos(\omega_{IF}t)) +$$

$$\sum_{n=1}^{7}((CA_{PS-n}(t) \oplus D_n(t)) * \sin(\omega_{IF}t))$$

$$A_{IF-S1}(t) = \sum_{n=1}^{7}((CA_{SPS-n}(t) \oplus D_n(t)) * \cos(\omega_{IF}t)) +$$

$$\sum_{n=1}^{7}((CA_{RS-n}(t) \oplus D_n(t)) * \sin(\omega_{IF}t))$$

$$A_{RF-L5}(t) = A_{IF-L5}(t) * A_{LO-L5}(t)$$

$$A_{RF-S1}(t) = A_{IF-S1}(t) * A_{LO-L5}(t)$$

$$A_{RF(t)} = A_{RF-L5}(t) + A_{RF-S1}(t)$$

FIG. 13 also depicts the navigation data generation at the IF level, which is further translated to the S1 and L5 IRNSS frequency bands.

FIG. 14 exemplarily illustrates a table showing signal simulation parameters used in various modes, for example, the code diversity mode, the carrier diversity mode, and the hybrid mode. The configuration for the navigation data sub-frames is disclosed in the co-pending patent application titled "Navigation Data Structure Generation and Data Transmission for Optimal Time to First Fix".

Figure 15:
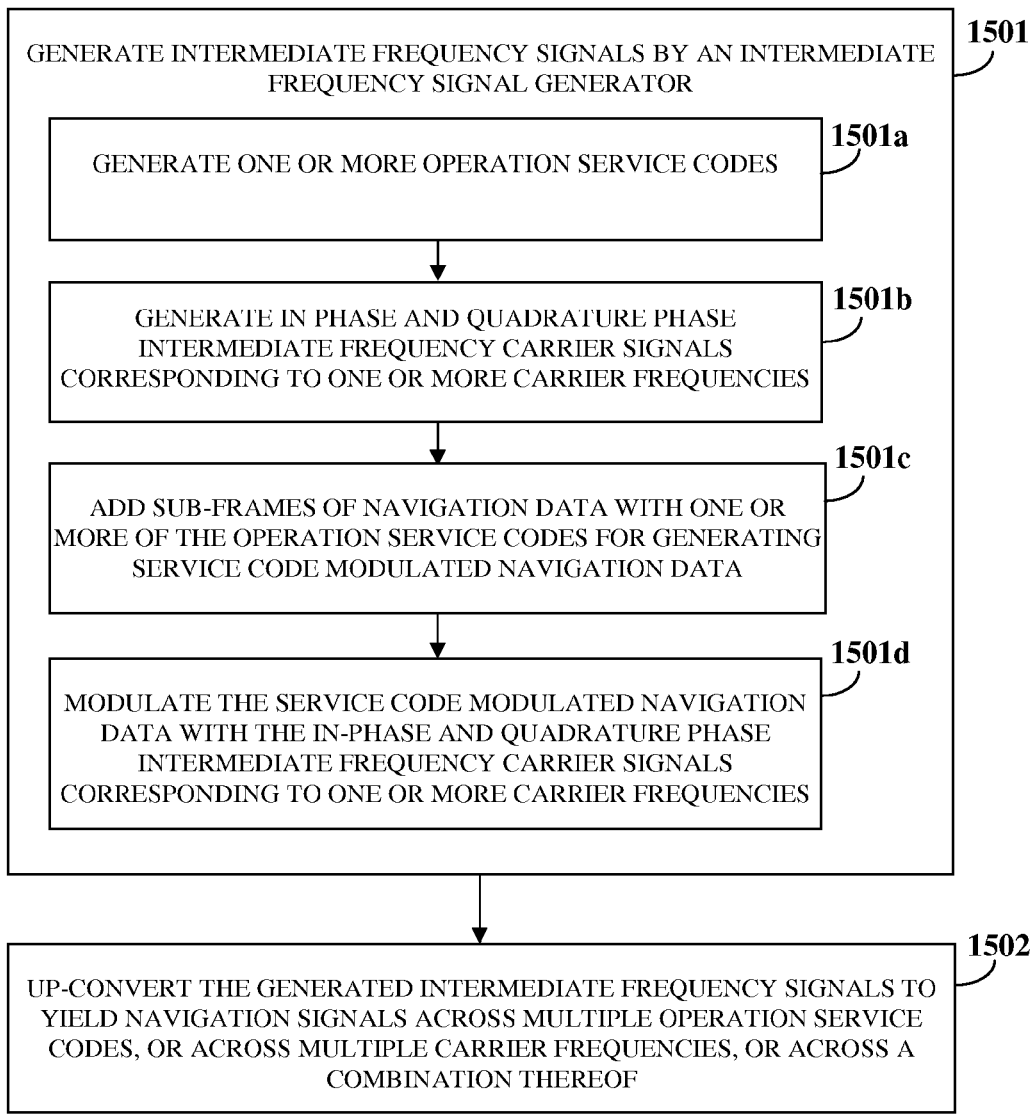
FIG. 15 illustrates a method for generating navigation signals across multiple operation service codes, across multiple carrier frequencies, or across a combination thereof.

FIG. 15 illustrates a method for generating navigation signals across multiple operation service codes, across multiple carrier frequencies, or across a combination thereof. The system 700, as exemplarily illustrated in FIG. 7 and FIG. 10, comprises an intermediate frequency (IF) signal generator 701 and one or more radio frequency translators 702. The IF signal generator 701 generates 1501 intermediate frequency (IF) signals comprising data, for example, proposed sub-frames, code and carrier at baseband. As exemplarily illustrated in FIG. 8, FIG. 11, and FIG. 13, the IF signal generator 701 comprises one or more operation service code generators 801a and 801b, one or more intermediate frequency (IF) carrier generators 802a and 802b, one or more adders 803, and one or more modulators 804. The operation service code generators 801a and 801b, for example, the PS code generator 801a and/or the SPS code generator 801b generate 1501a one or more operation service codes.

The IF carrier generators 802a and 802b generate 1501b in-phase and quadrature phase IF carrier signals corresponding to one or more of the multiple carrier frequencies, for example, the L5 carrier frequency and the S1 carrier frequency. Sub-frames of navigation data are added 1501c with one or more of the operation service codes using the adders 803 for generating service code modulated navigation data. The service code modulated navigation data is modulated 1501d with the in-phase and quadrature phase IF carrier signals corresponding to one or more carrier frequencies using the modulators 804 for generating intermediate frequency signals. The radio frequency translators 702 up-convert 1502 the generated intermediate frequency signals to yield navigation signals across multiple operation service codes, across multiple carrier frequencies, or across a combination thereof.

The navigation signals comprising sub-frames of navigation data are transmitted across multiple operation service codes, across multiple carrier frequencies, or across a combination thereof, to the satellite navigation receiver 100 exemplarily illustrated in FIG. 1. The sub-frames of navigation data are transmitted to the satellite navigation receiver 100 in one or more predefined sequences across each of the operation service codes, across each of the carrier frequencies, or across a combination of the operation service codes and the carrier frequencies. The transmission of the sub-frames of navigation data in one or more of the predefined sequences exemplarily illustrated in FIGS. 4-6, to the satellite navigation receiver 100 optimizes collection time of ephemeris data ($T_{eph}$) by the satellite navigation receiver 100.

Figure 16:
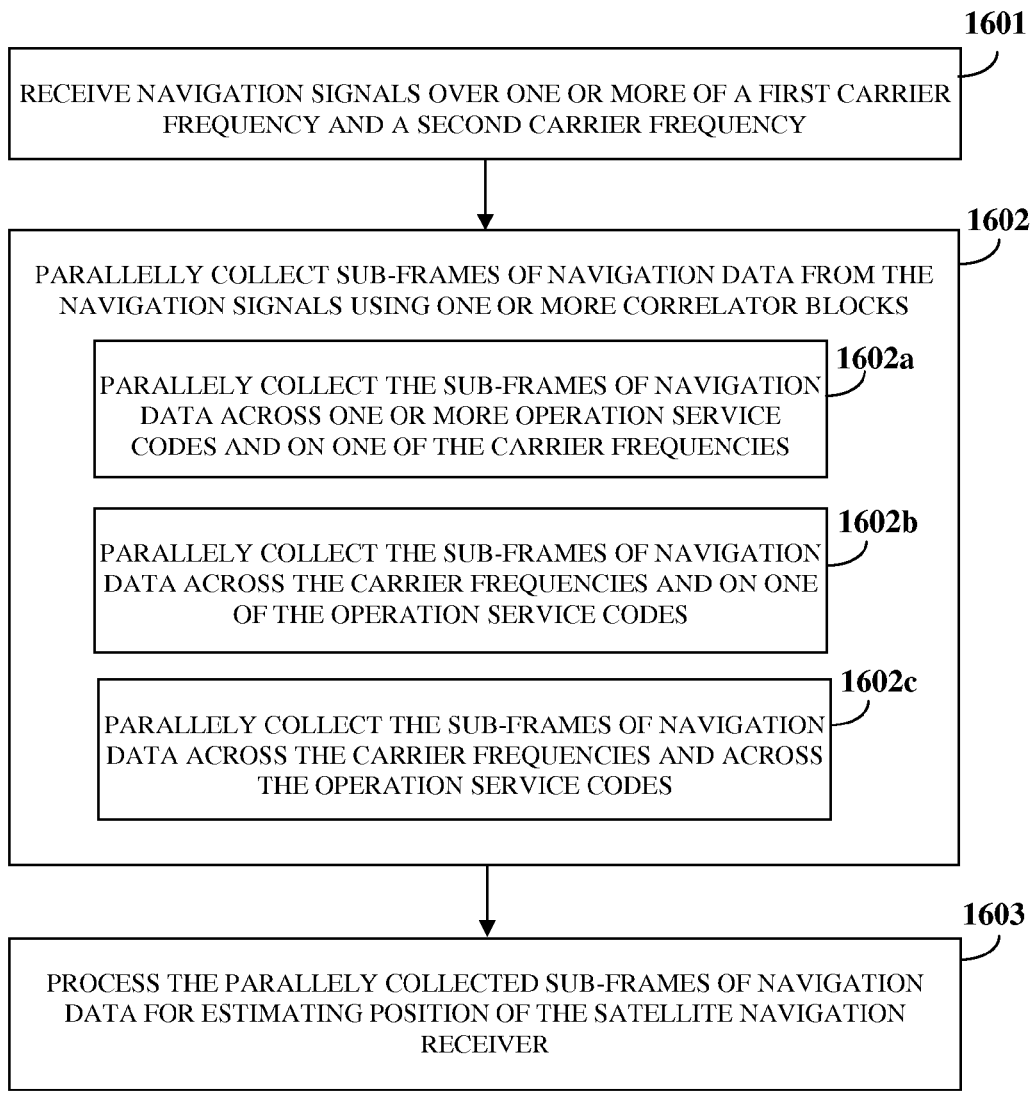
FIG. 16 illustrates a method for reducing a time to first fix parameter based on code diversity and/or carrier diversity in a satellite navigation receiver.

FIG. 16 illustrates a method for reducing a time to first fix parameter based on code diversity and/or carrier diversity in a satellite navigation receiver 100. The satellite navigation receiver 100, as exemplarily illustrated in FIG. 1 and disclosed in the detailed description of FIG. 1, comprises a radio frequency translator 101, one or more correlator blocks 104, and a navigation data processor 105. The radio frequency translator 101 comprises, for example, two input channels for receiving 1601 navigation signals over one or more of a first carrier frequency, for example, the L5 frequency and a second carrier frequency, for example, the S1 frequency from one or more satellites. The radio frequency translator 101 conditions the navigation signals over one or more of the first carrier frequency and the second carrier frequency. In an embodiment, the satellite navigation receiver 100 further comprises one or more down-converters 102a and 102b for down-converting the conditioned navigation signals over one or more of the first carrier frequency and the second carrier frequency.

The sub-frames of navigation data are parallelly collected 1602 from the navigation signals using the correlator blocks 104. The correlator blocks 104 comprise a predetermined number of correlator channels 104a configured for the first carrier frequency and the second carrier frequency. The predetermined number of the correlator channels 104a is divided for parallel collection of the sub-frames of navigation data from the navigation signals across one or more operation service codes. The operation service codes comprise, for example, navigation data encodings for a precise service (PS) and a special positioning service (SPS).

In a code diversity mode, the parallel collection of the sub-frames of the navigation data comprises parallel collection 1602a of the sub-frames of navigation data across one or more operation service codes and on one of the carrier frequencies, for example, the first carrier frequency or the second carrier frequency. In a carrier diversity mode, the sub-frames of navigation data are parallelly collected 1602b across the carrier frequencies, for example, the first carrier frequency and the second carrier frequency and on one of the operation service codes. In a hybrid mode, the sub-frames of navigation data are parallelly collected 1602c across the carrier frequencies, for example, the first carrier frequency and the second carrier frequency and across the operation service codes. The navigation data processor 105 processes 1603 the parallelly collected sub-frames of navigation data for estimating position of the satellite navigation receiver 100. The parallel collection of the sub-frames of navigation data across the first carrier frequency and the second carrier frequency and/or across the operation service codes reduces the time to first fix parameter of the position of the satellite navigation receiver 100.

GPSGLDRX, a dual RF front end GPS GLONASS receiver developed by Accord Software & Systems Pvt. Ltd., has been used as a reference hardware platform to develop the algorithms in accordance with the navigation data signal configurations disclosed herein. This receiver can accept RF signals from two separate GPS-GLONASS antennas. A printed circuit board that houses the GPSGLDRX receiver comprises two separate RF down converters 102a and 102b for GPS and GLONASS frequencies. The block diagram of a modified satellite navigation receiver 100 based on the dual RF front end GPS GLONASS receiver developed by Accord Software & Systems Pvt. Ltd. is exemplarily illustrated in FIG. 1.

The input IRNSS signal, S1 or L5, is fed to the RF translator 101 of the satellite navigation receiver 100, which is suitably conditioned to obtain the 1575.42 MHz signal. Subsequently, this signal is fed to the GPS down-converter 102a or 102b on the GPSGLDRX board for further processing. A common clock 103 is used across all the stages of down-conversion including the RF translator 101. The down-converted signal is further fed to a field programmable gate array (FPGA), which implements two separate 14-channel IRNSS correlator blocks 104. Each correlator block 104 is dedicated to a particular carrier frequency band, for example, L5 band or S1 band. Of the 14 channels 104a in each correlator block 104, seven channels 104a are dedicated for SPS and PS operations each, respectively, totaling 28 channels 104a. Following this, a digital signal processor (DSP) herein also referred to as the navigation data processor 105 of the satellite navigation receiver 100 processes the correlation values from the FPGA leading to data-bit demodulation and user position computation.

Figure 17:
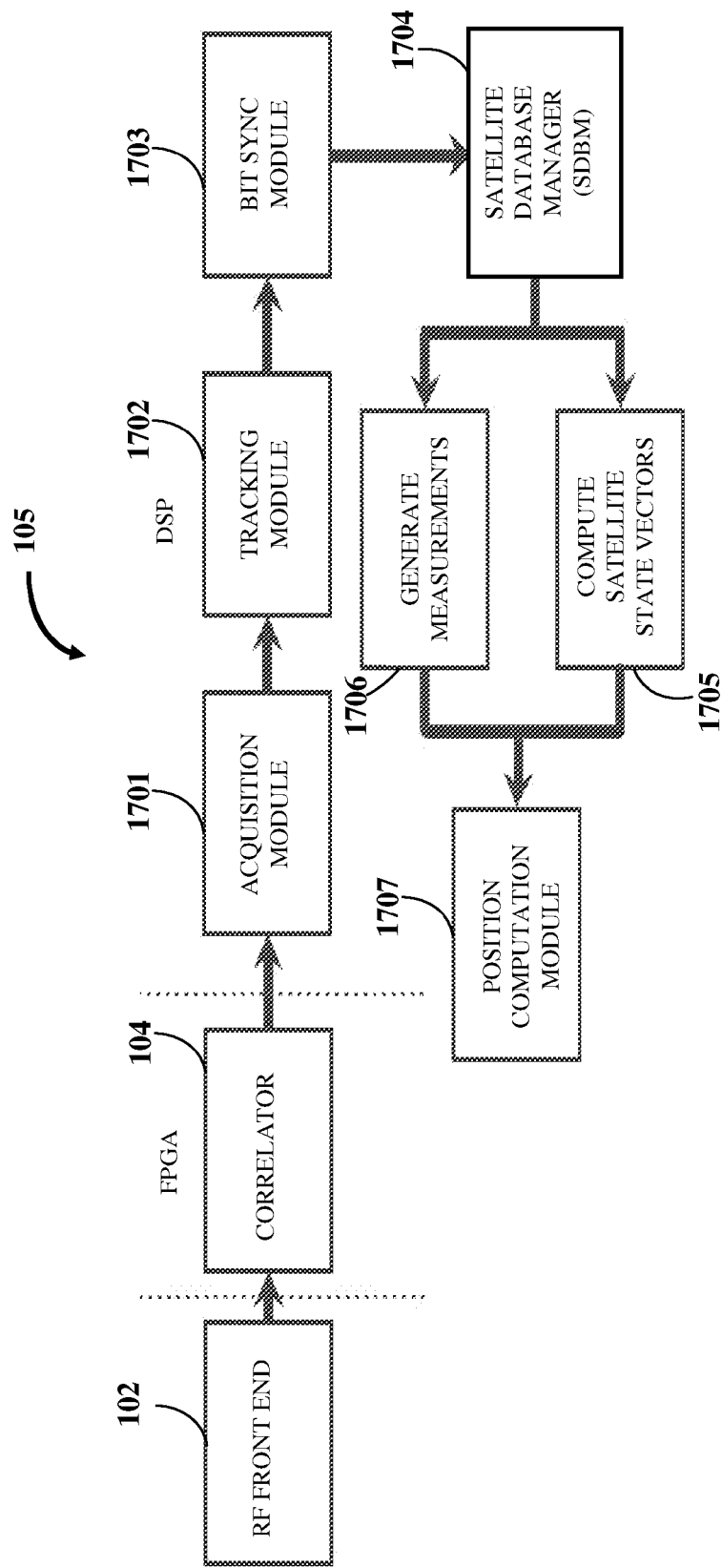
FIG. 17 exemplarily illustrates a top level block flow diagram of the satellite navigation receiver.

FIG. 17 exemplarily illustrates a top level block flow diagram of the satellite navigation receiver 100. The global navigation satellite system (GNSS) signal emanating from the satellites is received by a suitable antenna for further processing. The RF front end 102 herein also referred to as a "down converter", and the FPGA correlator 104 are disclosed with reference to the detailed description of FIG. 1. The RF front end 102 conditions the signal to a suitable intermediate frequency (IF). The correlator 104 accepts digitized data and performs a code and carrier wipe off. The digital signal processor (DSP) based navigation data processor 105 comprises an acquisition module 1701, a tracking module 1702, a bit synchronization (sync) module 1703, a satellite database manager (SDBM) 1704, and a position computation module 1707. The acquisition module 1701 acquires navigation signals from all visible satellites and passes coarse estimates of code phase and carrier Doppler frequency of the visible satellites to the tracking module 1702. Based on the correlation values from the correlator 104, the acquisition module 1701 in the navigation data processor 105 attempts to lock onto visible satellites in code and carrier domains.

Following a successful acquisition, the tracking module 1702 tracks each of the visible satellites based on the estimated coarse code phase and carrier information, for example, based on the acquired estimate of code and carrier Doppler frequency of the visible satellites leading to data bit demodulation. Successful tracking ensures data bit demodulation without any errors. This in turn translates to the collection of all the four sub-frames of navigation data. The bit synchronization module 1703 performs bit synchronization on the navigation data bits. The satellite database manager (SDBM) 1704 incorporates all the functions from grouping of data-bits as received from the tracking process leading to framing the data based on ephemeris data, almanac data and text messages. The SDBM 1704 frames the navigation data based on the data bit demodulation. The SDBM 1704 achieves lock on a frame with the aid of a synchronization (sync) pattern. Subsequently, the SDBM 1704 performs Viterbi decoding followed by a cyclic redundancy check (CRC) validation. Based on a sub-frame identifier (ID), a decision is then taken regarding the navigation data content. The navigation data processor 105 also generates measurements 1706 and computes satellite state vectors 1705. The position computation module 1707 estimates the position of the satellite navigation receiver 100 based on the navigation data.

To demonstrate the performance improvements, three versions of the receiver software corresponding to code diversity, carrier diversity, and the hybrid mode of navigation data signal configuration have been implemented. The software artifacts disclosed in the co-pending patent application titled "Navigation Data Structure Generation and Data Transmission for Optimal Time to First Fix" have been taken as a reference to develop the algorithms for code diversity, carrier diversity, and the hybrid modes of navigation data signal configuration. In a single frequency IRNSS receiver, a data bit collection module typically takes, for example, about 24 seconds (s) for the ephemeris data extraction, following which measurements are generated and the position is computed.

Figure 18A:
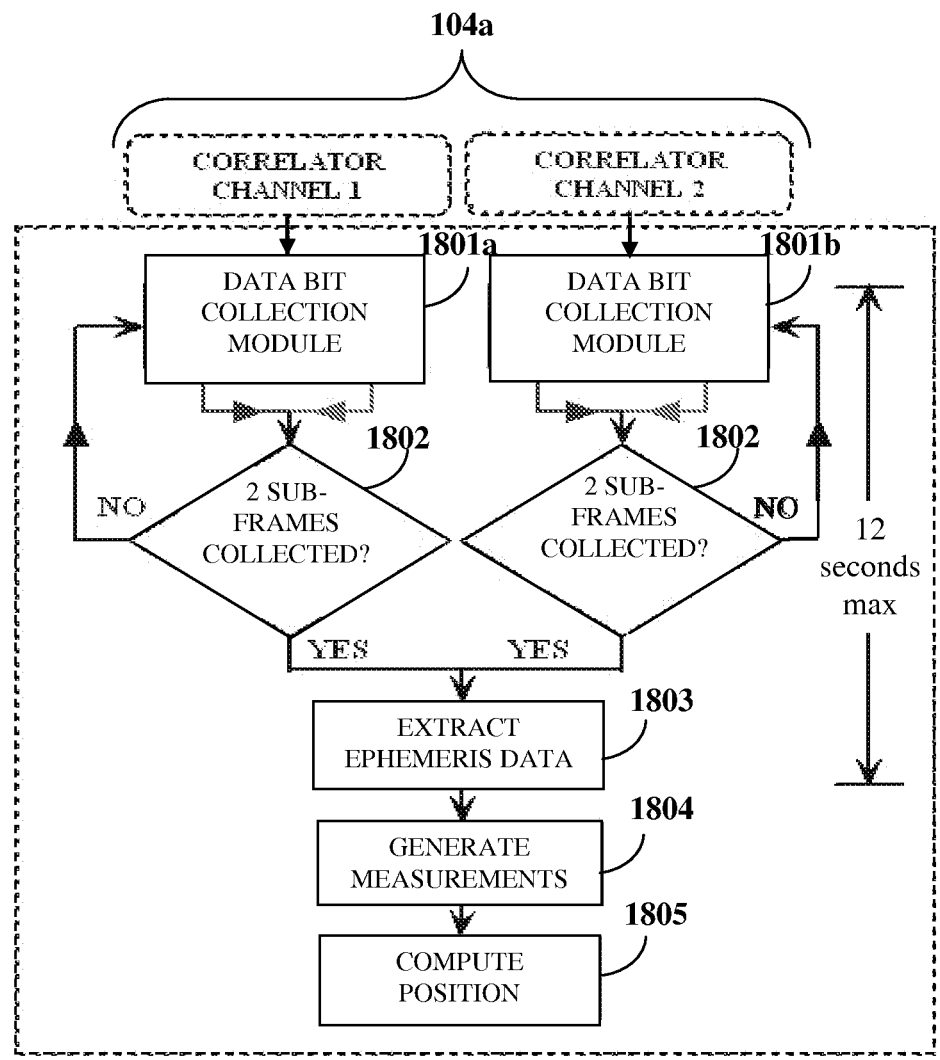
FIG. 18A exemplarily illustrates a flow diagram for code diversity or carrier diversity.

FIGS. 18A-21 disclose in detail the software and hardware implementation to achieve the improvement in $T_{eph}$ in each mode of operation leading to TTFF improvement. For code diversity, the receiver software is realized in accordance with the equations disclosed in the detailed description of FIGS. 7-8. For experiments, only the L5 path of FIG. 1 was used for further processing. A person of ordinary skill in the art may realize that the results obtained for the L5 band can be extended to the S1 band. The ranging codes used herein are exemplarily illustrated in FIG. 14. FIG. 18A exemplarily illustrates a flow diagram for code diversity or carrier diversity. The data bit collection module 1801a or 1801b on each of the parallel correlator channels 104a collects sub-frames of navigation data in a predefined sequence according to the data extraction sequence exemplarily illustrated in FIG. 4.

Figure 18B:
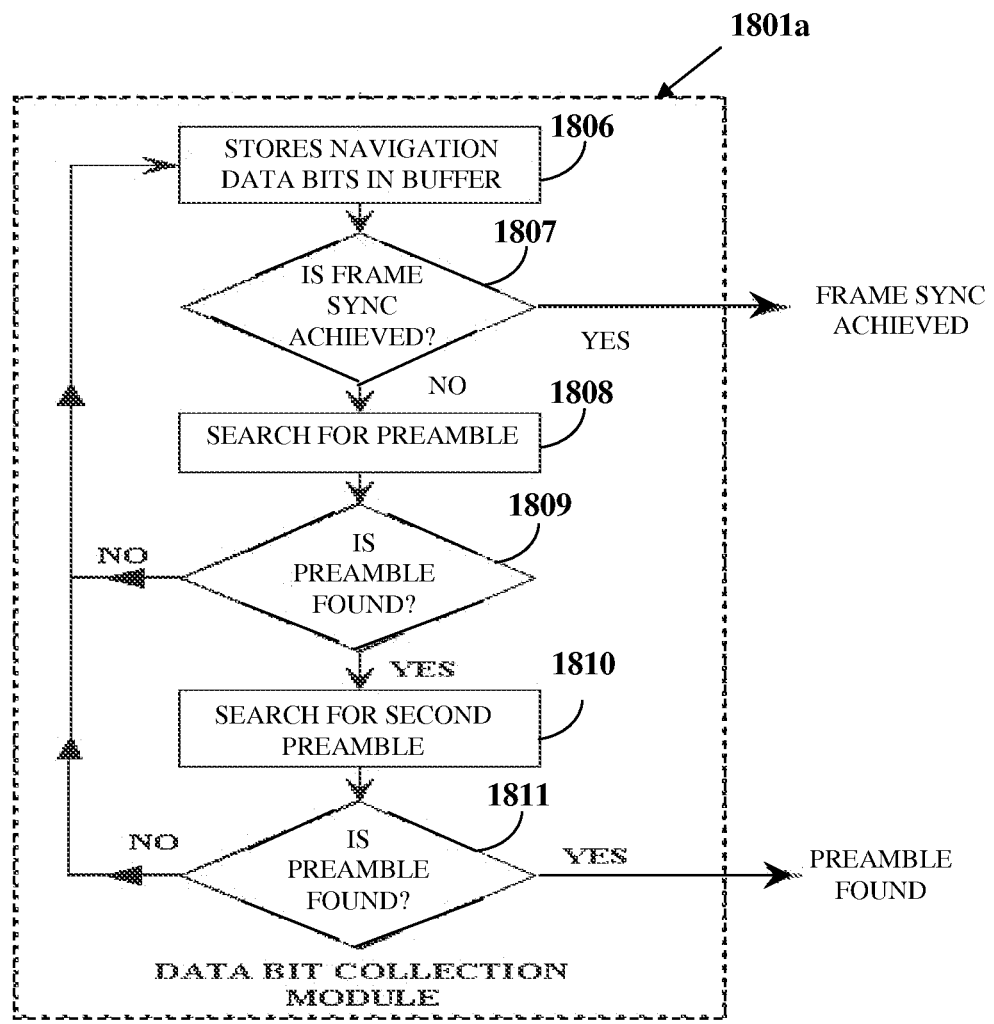
FIG. 18B exemplarily illustrates a flow diagram for sub-frame synchronization on one of the correlator channels in a data bit collection module shown in FIG. 18A.

FIG. 18B exemplarily illustrates a flow diagram for sub-frame synchronization on one of the correlator channels 104a in the data bit collection module 1801a or 1801b shown in FIG. 18A. The data bit collection module 1801a or 1801b stores 1806 navigation data bits from the correlator 104 exemplarily illustrated in FIG. 1 in a buffer, and determines whether frame synchronization (sync) is achieved 1807. Alternatively, a search 1808 for a preamble is performed, and if the preamble is found 1809, a search 1810 for a second preamble is performed. The preamble is a unique identification pattern which appears at the beginning of each sub-frame. If the second preamble is found 1811, sub-frames are collected 1802 and the ephemeris data is extracted 1803 as exemplarily illustrated in FIG. 18A. If the preambles are not found, the process returns to storing 1806 the navigation data bits in the buffer as exemplarily illustrated in FIG. 18B. In the code diversity mode exemplarily illustrated in FIG. 18A, the ephemeris data extraction takes about 12 seconds, following which measurements are generated 1804 and the position is computed 1805. As exemplarily illustrated in FIG. 4 and FIG. 18A, four sub-frames of navigation data, namely, sub-frame 1 through sub-frame 4 are collected within 12 seconds from bit synchronization.

Figure 19:
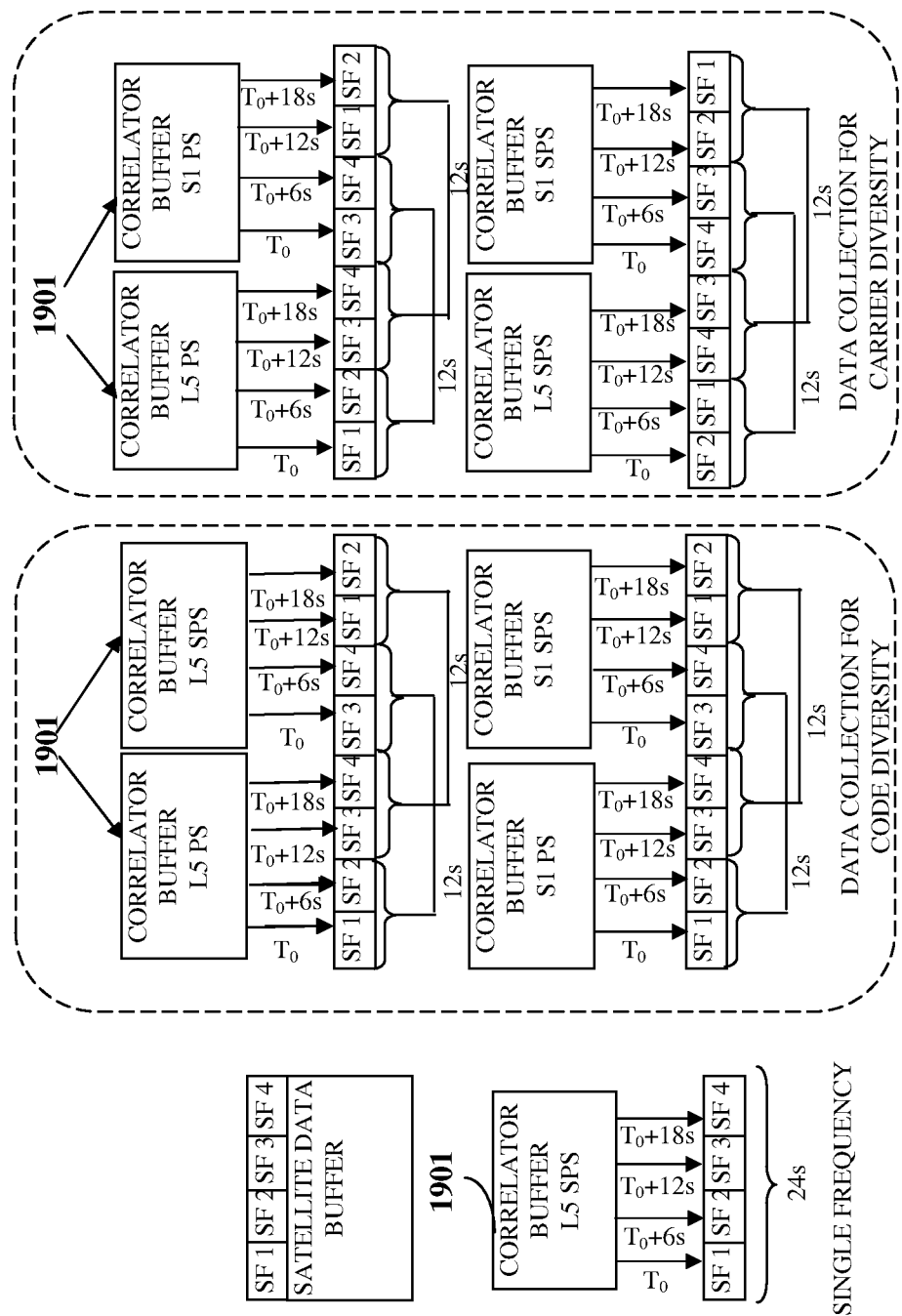
FIG. 19 exemplarily illustrates a timing diagram for data collection in a single frequency satellite navigation receiver and a dual frequency satellite navigation receiver with a code diversity signal configuration and a carrier diversity signal configuration.

FIG. 19 exemplarily illustrates a timing diagram for data collection in a single frequency satellite navigation receiver and a dual frequency satellite navigation receiver 100, exemplarily illustrated in FIG. 1, with a code diversity signal configuration and a carrier diversity signal configuration. FIG. 19 provides a pictorial representation of events that occur for a given satellite in the code diversity mode and the carrier diversity mode from a first data bit demodulation to a complete navigation data collection. The correlator blocks 104 of the satellite navigation receiver 100 disclosed herein further comprise parallel correlator buffers 1901. The correlator buffers 1901 are memory blocks which store data to be processed by the satellite database manager (SDBM) 1704 exemplarily illustrated in FIG. 17. Each channel 104a has a dedicated correlator buffer 1901 to store the data bits. In the case of a single frequency satellite navigation receiver, the data as collected in the correlator buffer 1901 is processed sequentially till all the four sub-frames are received. The optimal time to obtain all the four sub-frames in the single frequency satellite navigation receiver is 24 seconds. In code diversity and carrier diversity, the correlator 104 comprises two channels 104a per satellite. This effectively provides two channels 104a for the data processing. As exemplarily illustrated in the flow chart of FIG. 18A, grouping the navigation data across two paths ensures that the time for collection is reduced to 12 seconds, as exemplarily illustrated in FIG. 19.

As exemplarily illustrated in FIG. 19, the parallel correlator buffers 1901 are configured for correlating locally generated signals with the navigation signals across one or more operation service codes and on the first carrier frequency or the second carrier frequency. In an embodiment, the parallel correlator buffers 1901 are configured for correlating locally generated signals with the navigation signals across the first carrier frequency and the second carrier frequency and on one of the operation service codes.

For carrier diversity, the receiver software is implemented in accordance with the equations disclosed in the detailed description of FIG. 10. Both RF paths of FIG. 1 are energized with seven channels 104a each. The PS codes are simulated on both L5 and S1 frequencies. As with code diversity, the results obtained for PS codes can be extended to the SPS codes. The ranging codes used herein are exemplarily illustrated in FIG. 14. The data bit collection module 1801a or 1801b on each of the parallel correlator channels 104a exemplarily illustrated in FIG. 18A, collects sub-frames of navigation data in a predefined sequence according to the data extraction sequence as exemplarily illustrated in FIG. 5. As exemplarily illustrated in FIG. 5 and FIG. 18A, four sub-frames of navigation data, namely, sub-frame 1 through sub-frame 4 are collected 1802 within 12 seconds from bit synchronization. FIG. 19 exemplarily illustrates the corresponding timing diagram for data collection in a dual frequency satellite navigation receiver 100 with the carrier diversity signal configuration.

For a hybrid combination of code diversity and carrier diversity, the receiver software is a combination of the code diversity and carrier diversity mode. The receiver software is implemented in accordance with the equations disclosed in the detailed description of FIG. 13. The processing involves both the carrier frequency bands and services of operation, for example, SPS and PS. The process algorithm or the software configuration to achieve optimal performance is exemplarily illustrated in FIG. 20.

Figure 20:
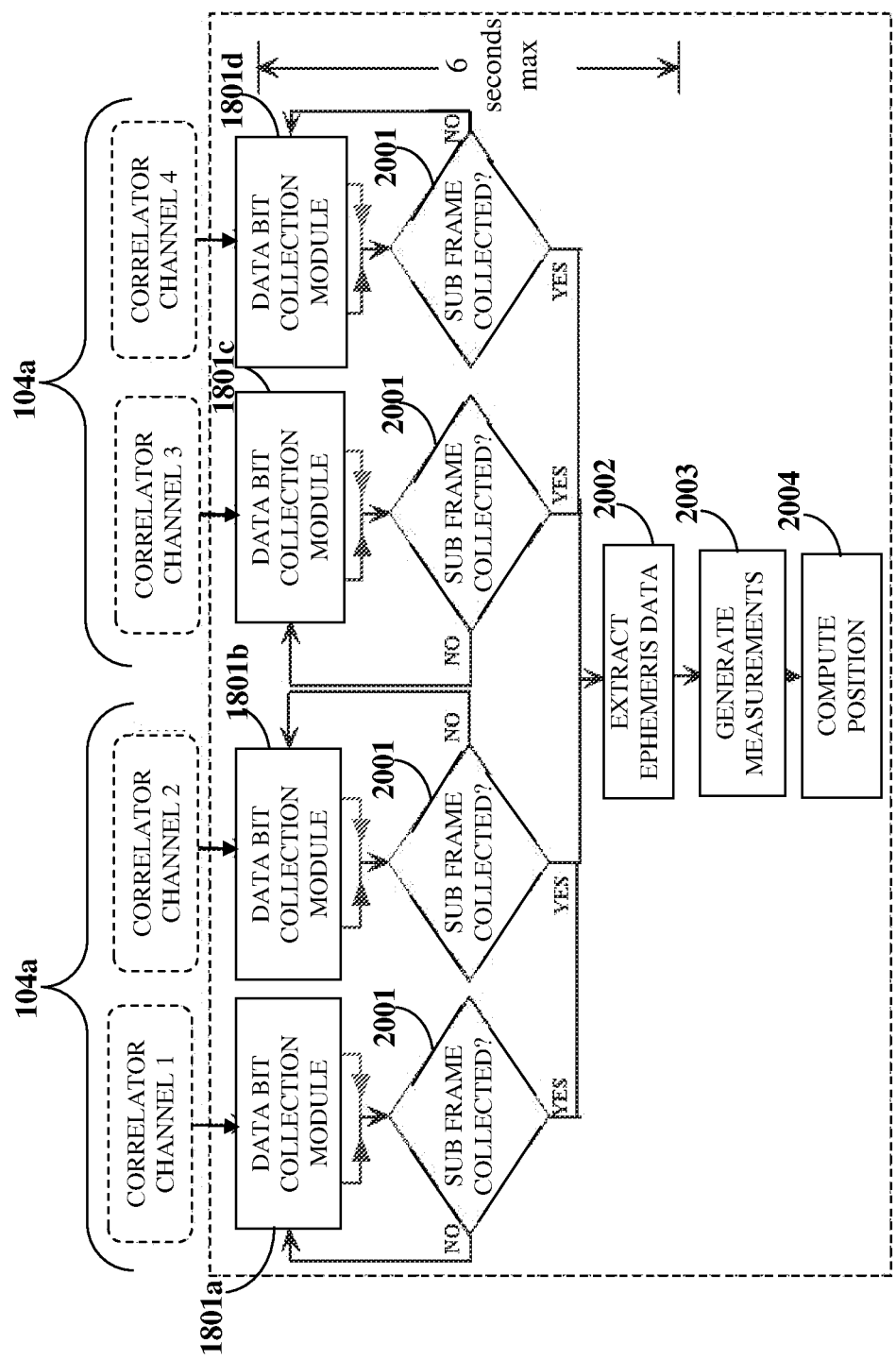
FIG. 20 exemplarily illustrates a high level flow diagram for a hybrid combination of code diversity and carrier diversity.

FIG. 20 exemplarily illustrates a high level flow diagram for a hybrid combination of code diversity and carrier diversity. The data bit collection module 1801a-1801d on each of the parallel correlator channels 104a collects sub-frames of navigation data in a predefined sequence according to the data extraction sequence exemplarily illustrated in FIG. 6. As exemplarily illustrated in FIGS. 6 and 20, four sub-frames of navigation data, namely, sub-frame 1 through sub-frame 4 are collected 2001, for example, within 6 seconds (s) from bit synchronization. In the hybrid mode, the ephemeris data extraction 2002 takes, for example, about 6 seconds, following which measurements are generated 2003 and the position is computed 2004.

Figure 21:
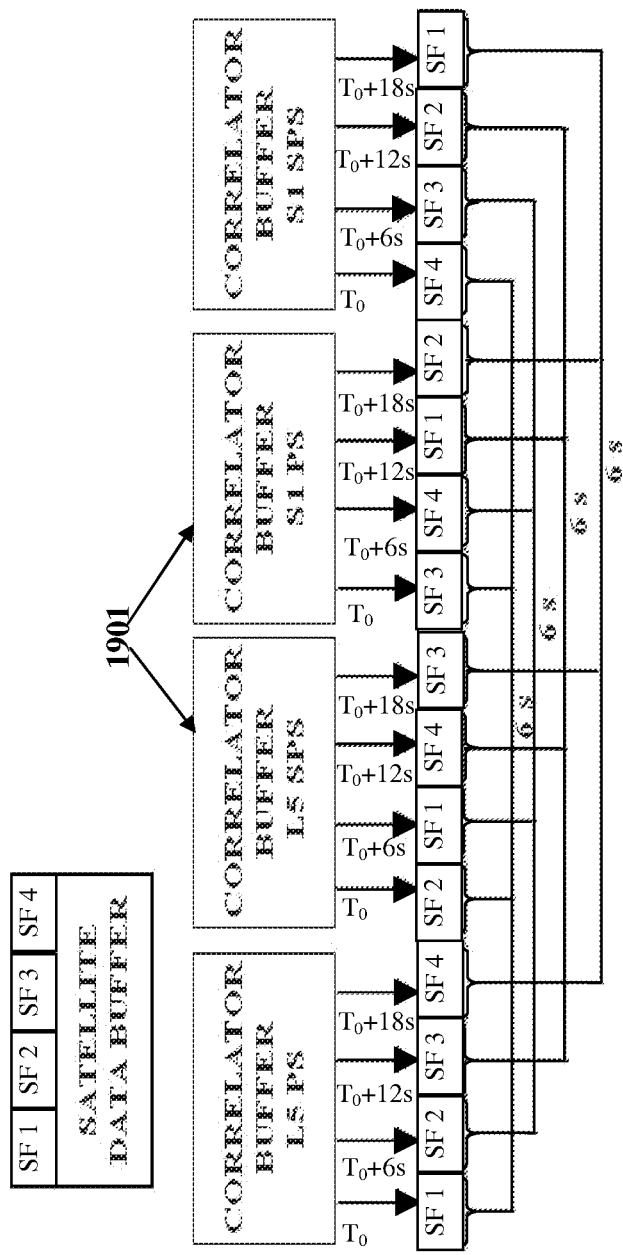
FIG. 21 exemplarily illustrates a timing diagram for data collection for a hybrid combination of a code diversity signal configuration and a carrier diversity signal configuration.

FIG. 21 exemplarily illustrates a timing diagram for data collection for a hybrid combination of a code diversity signal configuration and a carrier diversity signal configuration. FIG. 21 provides a pictorial representation of the events that occur for a given satellite in the hybrid mode from the first data bit demodulation to the complete navigation data collection. In the hybrid mode, the correlator 104, exemplarily illustrated in FIG. 1, has four channels 104a per satellite. In the method disclosed herein, optimal grouping of the navigation data across all the four paths ensures that the entire navigation data is collected, for example, within 6 seconds (s) as exemplarily illustrated in FIG. 21. In another embodiment, the parallel correlator buffers 1901, exemplarily illustrated in FIG. 21, are configured for correlating locally generated signals with the navigation signals across the first carrier frequency and the second carrier frequency, S1 and L5, and across the operation service codes, SPS and PS.

To demonstrate the performance improvements of the code diversity, carrier diversity and hybrid methods disclosed herein, three versions of the system 700 disclosed herein also referred to as a "simulator" and referenced by the numeral 700, and receiver software corresponding to code diversity, carrier diversity and hybrid modes have been tested independently. The simulation parameters are exemplarily illustrated in FIG. 14. The test methods assess the performance improvement by profiling $T_{eph}$ as exemplarily illustrated in FIG. 25, leading to user position computation.

Figure 22:
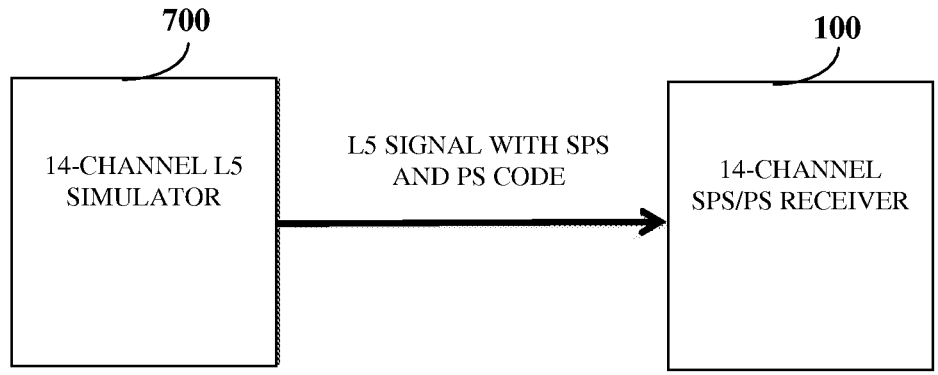
FIG. 22 exemplarily illustrates a test apparatus for code diversity.
Figure 26:
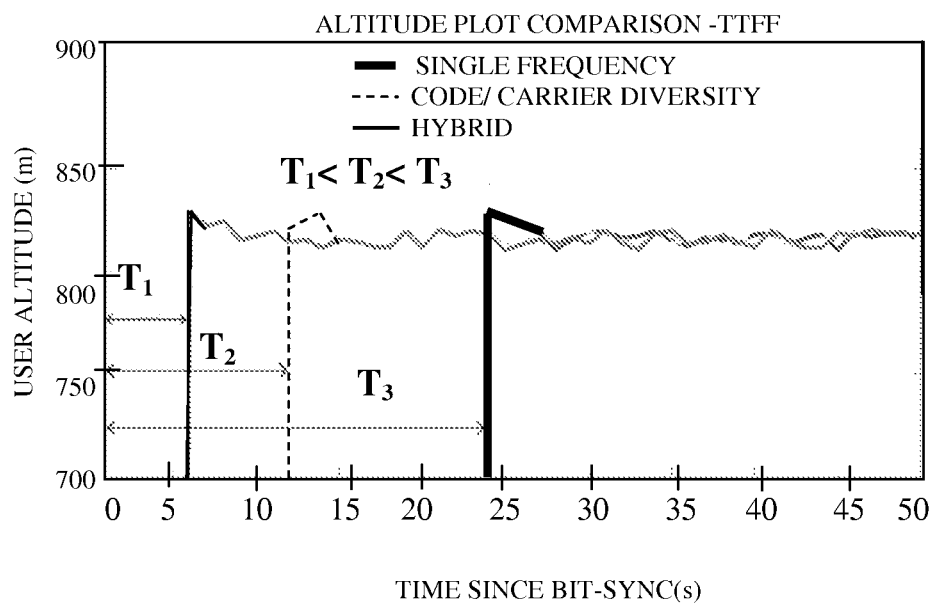
FIG. 26 exemplarily illustrates a graphical representation of an altitude plot for different navigation data signal configurations.

FIG. 22 exemplarily illustrates a test apparatus for code diversity. The test set up exemplarily illustrated in FIG. 22 comprises the simulator 700 shown in FIG. 7 and the satellite navigation receiver 100 shown in FIG. 1. The signal from the 14-channel L5 IRNSS signal simulator 700 is fed to the 14 channels 104a of the satellite navigation receiver 100 dedicated to L5 carrier frequency, wherein the satellite navigation receiver 100 includes the data collection module 1801a or 1801b based on code diversity. Ephemeris collection time (Teph) is monitored for satellites leading to the position computation. FIG. 26 exemplarily illustrates a graphical representation of an altitude plot for different navigation data signal configurations disclosed herein. As exemplarily illustrated in FIG. 26, it takes, for example, about 12 seconds from bit synchronization of the fourth satellite leading to the position computation. In comparison with existing single frequency results, the code diversity method shows a 50% improvement in TTFF. In the single frequency mode, the TTFF measure demonstrated herein is optimal for the PS user receiver 100.

Figure 23:
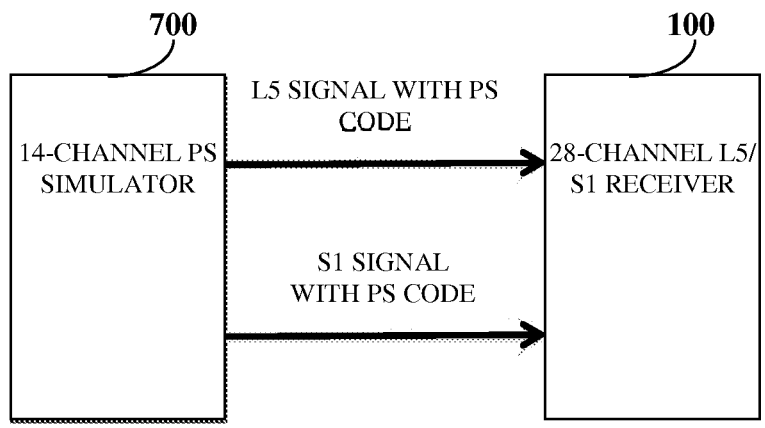
FIG. 23 exemplarily illustrates a test apparatus for code diversity or carrier diversity.

FIG. 23 exemplarily illustrates a test apparatus for code diversity or carrier diversity. The test apparatus set up exemplarily illustrated in FIG. 23 comprises a 14-channel PS simulator 700 shown in FIG. 10 and a 28-channel satellite navigation receiver 100 shown in FIG. 1 having channels 104a dedicated for both the carrier frequencies. As exemplarily illustrated in FIG. 26, the carrier diversity method shows a 50% improvement in TTFF due to the improvement in $T_{eph}$. This is an optimal result achieved with respect to TTFF for an SPS user receiver 100 with a LOS signal and in a cold start mode.

Figure 24:
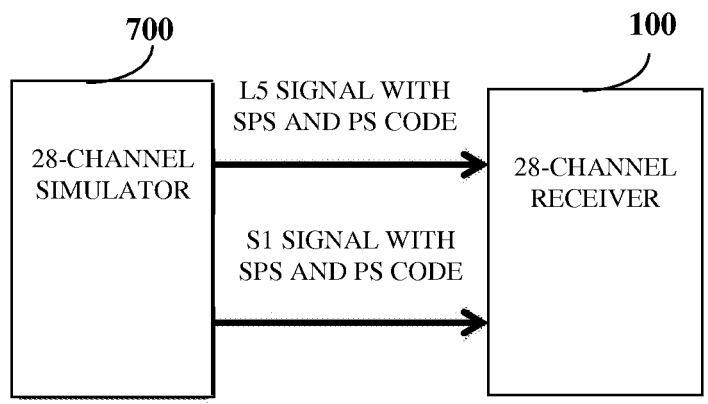
FIG. 24 exemplarily illustrates a test apparatus for a hybrid combination of code diversity and carrier diversity.

FIG. 24 exemplarily illustrates a test apparatus for a hybrid combination of code diversity and carrier diversity. The test apparatus set up exemplarily illustrated in FIG. 24 comprises a 28-channel simulator 700 and a 28-channel satellite navigation receiver 100 shown in FIG. 1 having channels 104a dedicated for both the carrier frequencies and the operation service codes. To demonstrate the performance improvement in a dual frequency PS user receiver 100, the simulator-receiver combination is shown in FIG. 24. As exemplarily illustrated in FIG. 26, the hybrid method exhibits an optimal TTFF of 6 seconds (s), which is optimal for a PS user receiver 100. When compared with the existing GPS L1/L2, PS/SPS signal configurations, a five-fold improvement in positioning performance is observed.

Figure 25:
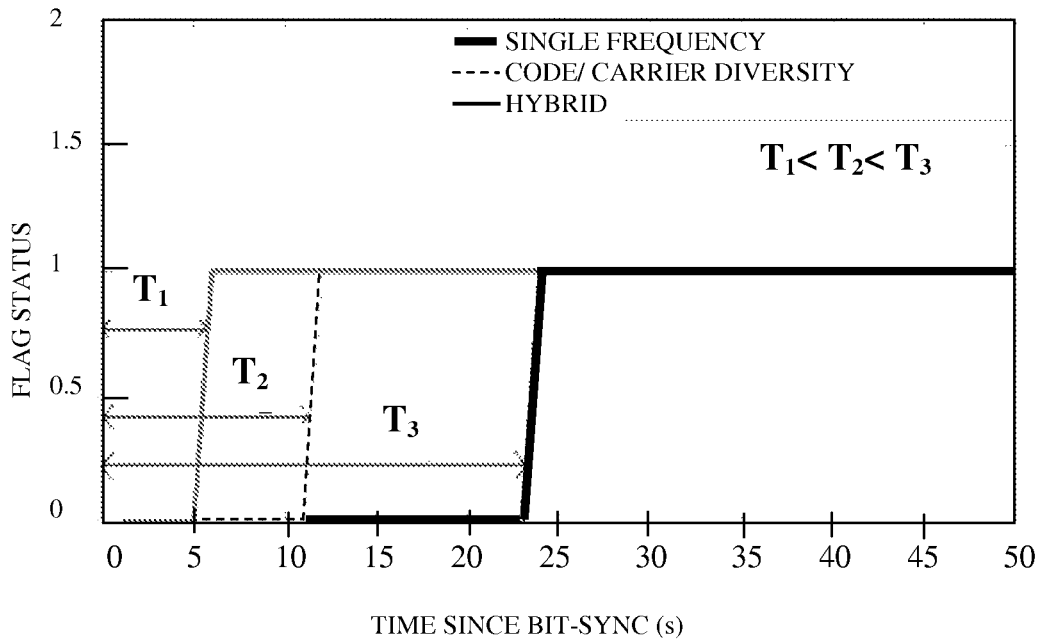
FIG. 25 exemplarily illustrates a graphical representation plotting of an ephemeris collection flag.

FIG. 25 exemplarily illustrates a graphical representation plotting of an ephemeris collection flag. The $T_{eph}$ parameter is logged at the receiver output using a graphical user interface software. FIG. 26 exemplarily illustrates a graphical representation of an altitude plot for different navigation data signal configurations disclosed herein.

Figure 27:
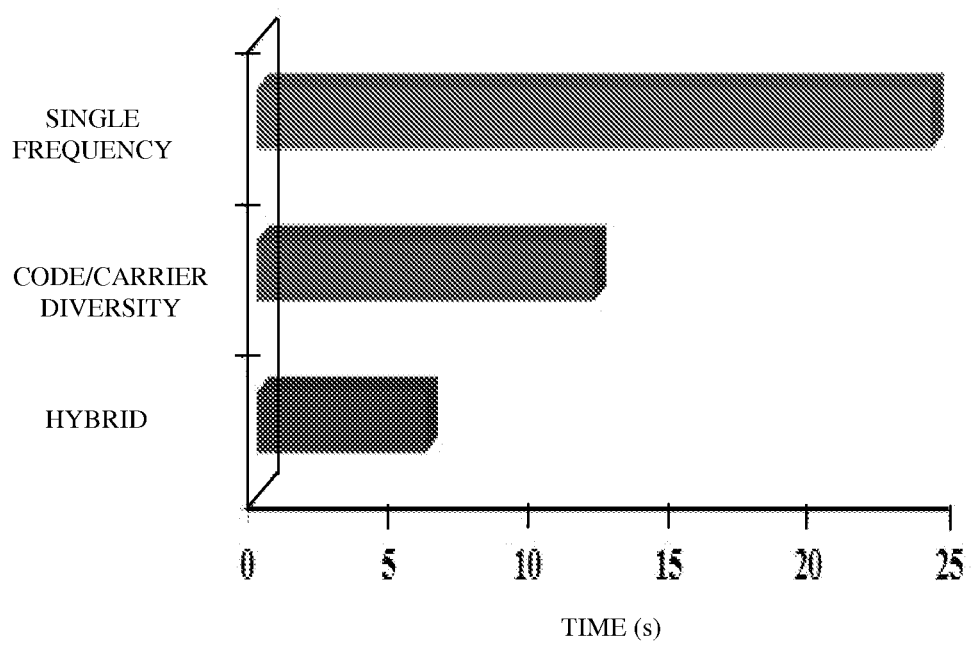
FIG. 27 exemplarily illustrates a graphical representation showing a comparison of collection time of ephemeris data ($T_{eph}$) according to the satellite navigation receiver, method and navigation data signal configurations disclosed herein.

FIG. 27 exemplarily illustrates a graphical representation showing a comparison of collection time of ephemeris data ($T_{eph}$) according to the satellite navigation receiver 100, method and navigation data signal configurations disclosed herein. The satellite navigation receiver 100 exemplarily illustrated in FIG. 1, method and system 700 exemplarily illustrated in FIG. 7 and FIG. 10, disclosed herein implements three new navigation data configurations to enhance the TTFF of PS and SPS users. Each method has been theoretically deduced, signals have been simulated, and the receiver software has been configured to demonstrate the performance. The first method, herein referred to as code diversity, exclusively meant for the PS users demonstrates a TTFF of, for example, about 12 seconds (s) as compared to about 30 seconds for GPS. The second method, herein referred to as carrier diversity, is applicable to both PS and SPS users, and demonstrates a TTFF of, for example, about 12 seconds. In the third method for PS users, a hybrid combination of code diversity and carrier diversity methods provides an optimal TTFF achieved for any LOS user in cold start mode of, for example, about 6 seconds.

It will be readily apparent that the various methods and algorithms disclosed herein may be implemented on computer readable media appropriately programmed for general purpose computers and computing devices. As used herein, the term "computer readable media" refers to non-transitory computer readable storage media that participate in providing data, for example, instructions that may be read by a computer, a processor or a like device. Non-transitory computer readable storage media comprise all computer readable media, for example, non-volatile media, volatile media, and transmission media, except for a transitory, propagating signal. Non-volatile media comprise, for example, optical disks or magnetic disks and other persistent memory volatile media including a dynamic random access memory (DRAM), which typically constitutes a main memory. Volatile media comprise, for example, a register memory, a processor cache, a random access memory (RAM), etc. Transmission media comprise, for example, coaxial cables, copper wire and fiber optics, including wires that constitute a system bus coupled to a processor. Common forms of computer readable media comprise, for example, a floppy disk, a flexible disk, a hard disk, magnetic tape, any other magnetic medium, a compact disc-read only memory (CD-ROM), a digital versatile disc (DVD), any other optical medium, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read. A "processor" refers to any one or more microprocessors, central processing unit (CPU) devices, computing devices, microcontrollers, digital signal processors or like devices. Typically, a processor receives instructions from a memory or like device and executes those instructions, thereby performing one or more processes defined by those instructions. Further, programs that implement such methods and algorithms may be stored and transmitted using a variety of media, for example, the computer readable media in a number of manners. In an embodiment, hard-wired circuitry or custom hardware may be used in place of, or in combination with, software instructions for implementation of the processes of various embodiments. Therefore, the embodiments are not limited to any specific combination of hardware and software. In general, the computer program codes comprising computer executable instructions may be implemented in any programming language. Some examples of languages that can be used comprise C, C++, C#, Perl, Python, or JAVA. The computer program codes or software programs may be stored on or in one or more mediums as object code. The computer program product disclosed herein comprises computer executable instructions embodied in a non-transitory computer readable storage medium, wherein the computer program product comprises computer program codes for implementing the processes of various embodiments.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

I claim:

1. A satellite navigation receiver, comprising:
a radio frequency translator comprising two input channels for receiving navigation signals over one or more of a first carrier frequency and a second carrier frequency from one or more satellites, wherein said radio frequency translator conditions said navigation signals over said one or more of said first carrier frequency and said second carrier frequency;
one or more correlator blocks comprising a predetermined number of correlator channels configured for said first carrier frequency and said second carrier frequency, wherein said predetermined number of said correlator channels is divided for parallel collection of sub-frames of navigation data from said navigation signals across one or more operation service codes, wherein said parallel collection of said sub-frames of said navigation data comprises one of:
parallelly collecting said sub-frames of said navigation data across said one or more operation service codes and on one of said first carrier frequency and said second carrier frequency;
parallelly collecting said sub-frames of said navigation data across said first carrier frequency and said second carrier frequency and on one of said one or more operation service codes; and
parallelly collecting said sub-frames of said navigation data across said first carrier frequency and said second carrier frequency and across said one or more operation service codes; and
a navigation data processor for processing said parallelly collected sub-frames of said navigation data to estimate position of said satellite navigation receiver;
whereby said parallel collection of said sub-frames of said navigation data across said first carrier frequency and said second carrier frequency and/or across said one or more operation service codes reduces a time to first fix parameter of said position of said satellite navigation receiver.

2. The satellite navigation receiver of claim 1, further comprising one or more down-converters for down-converting said conditioned navigation signals over one or more of said first carrier frequency and said second carrier frequency.

3. The satellite navigation receiver of claim 1, wherein said navigation data processor comprises:
an acquisition module for acquiring said navigation signals from visible satellites and estimating coarse code phase and carrier Doppler frequency of said visible satellites;
a tracking module for tracking each of said visible satellites based on said estimated coarse code phase and carrier Doppler frequency for data bit demodulation;
a satellite database manager for framing said navigation data based on said data bit demodulation; and
a position computation module for estimating said position of said satellite navigation receiver based on said navigation data.

4. The satellite navigation receiver of claim 1, wherein said one or more correlator blocks comprise parallel correlator buffers for performing one of:
correlating locally generated signals with said navigation signals across said one or more operation service codes and on one of said first carrier frequency and said second carrier frequency;
correlating locally generated signals with said navigation signals across said first carrier frequency and said second carrier frequency and on one of said one or more operation service codes; and
correlating locally generated signals with said navigation signals across said first carrier frequency and said second carrier frequency and across said one or more operation service codes.

5. The satellite navigation receiver of claim 1, wherein each of said correlator channels of said one or more correlator blocks collects said sub-frames of said navigation data in one or more predefined sequences, wherein said collection of said sub-frames of said navigation data in said one or more predefined sequences ensures that collection time of ephemeris data of said navigation data is reduced based on said collection of said sub-frames of said navigation data across one of said one or more operation service codes, said first carrier frequency and said second carrier frequency, and a combination thereof.

6. The satellite navigation receiver of claim 1, wherein said one or more operation service codes comprise navigation data encodings for a precise service and a special positioning service.

7. A satellite navigation receiver, comprising:
a radio frequency translator comprising a plurality of input channels for receiving navigation signals over M carrier frequencies from one or more satellites, wherein said radio frequency translator conditions said navigation signals over said M carrier frequencies;
one or more correlator blocks comprising a predetermined number of correlator channels configured for said M carrier frequencies, wherein said predetermined number of said correlator channels is divided for parallel collection of sub-frames of navigation data from said navigation signals across N operation service codes, wherein said parallel collection of said sub-frames of said navigation data comprises one of:
parallelly collecting said sub-frames of said navigation data across said N operation service codes and on one of said M carrier frequencies;
parallelly collecting said sub-frames of said navigation data across said M carrier frequencies and on one of said N operation service codes; and
parallelly collecting said sub-frames of said navigation data across said M carrier frequencies and across said N operation service codes; and
a navigation data processor for processing said parallelly collected sub-frames of said navigation data to estimate position of said satellite navigation receiver;
whereby said parallel collection of said sub-frames of said navigation data across said M carrier frequencies reduces a time to first fix parameter of said position of said satellite navigation receiver by a factor of M, said parallel collection of said sub-frames of said navigation data across said N operation service codes reduces said time to first fix parameter by a factor of N, and said parallel collection of said sub-frames of said navigation data across both said M carrier frequencies and said N operation service codes reduces said time to first fix parameter by a factor of M×N.

8. The satellite navigation receiver of claim 7, further comprising one or more down-converters for down-converting said conditioned navigation signals over said M carrier frequencies.

9. A method for reducing a time to first fix parameter in a satellite navigation receiver, comprising:
receiving navigation signals over one or more of a first carrier frequency and a second carrier frequency by a radio frequency translator of said satellite navigation receiver from one or more satellites, wherein said radio frequency translator conditions said navigation signals over said one or more of said first carrier frequency and said second carrier frequency;
parallelly collecting sub-frames of navigation data from said navigation signals using one or more correlator blocks of said satellite navigation receiver, wherein said one or more correlator blocks comprise a predetermined number of correlator channels configured for said first carrier frequency and said second carrier frequency, wherein said predetermined number of said correlator channels is divided for said parallel collection of said sub-frames of said navigation data across one or more operation service codes, wherein said parallel collection of said sub-frames of said navigation data comprises one of:
parallelly collecting said sub-frames of said navigation data across said one or more operation service codes and on one of said first carrier frequency and said second carrier frequency;
parallelly collecting said sub-frames of said navigation data across said first carrier frequency and said second carrier frequency and on one of said one or more operation service codes; and
parallelly collecting said sub-frames of said navigation data across said first carrier frequency and said second carrier frequency and across said one or more operation service codes; and
processing said parallelly collected sub-frames of said navigation data by a navigation data processor of said satellite navigation receiver for estimating position of said satellite navigation receiver;
whereby said parallel collection of said sub-frames of said navigation data across said first carrier frequency and said second carrier frequency and/or across said one or more operation service codes reduces said time to first fix parameter of said position of said satellite navigation receiver.

10. The method of claim 9, further comprising down-converting said conditioned navigation signals over one or more of said first carrier frequency and said second carrier frequency by one or more down-converters of said satellite navigation receiver.

11. The method of claim 9, wherein said processing of said parallelly collected sub-frames of said navigation data by said navigation data processor, comprises:
acquiring said navigation signals from visible satellites and estimating coarse code phase and carrier Doppler frequency of said visible satellites;
tracking each of said visible satellites based on said estimated coarse code phase and carrier Doppler frequency for data bit demodulation;
framing said navigation data based on said data bit demodulation; and
estimating said position of said satellite navigation receiver based on said navigation data.

* * * * *